US012688071B2

(12) United States Patent
Arunachalam et al.

(10) Patent No.: US 12,688,071 B2
(45) Date of Patent: Jul. 21, 2026

(54) METHOD AND SYSTEM FOR CONTROLLING AN APPLICATION FEATURE BASED ON SYSTEM METRICS

(71) Applicant: Aeris Communications, Inc., San Jose, CA (US)

(72) Inventors: Sundararaj Arunachalam, Naperville, IL (US); Mark E. Cratsenburg, Orinda, CA (US); Drew S. Johnson, San Jose, CA (US); Syed Zaeem Hosain, San Jose, CA (US); Subramanian Balakrishnan, Cupertino, CA (US)

(73) Assignee: Aeris Communications, Inc., Santa Clara, CA (US)

( * ) Notice: Subject to any disclaimer, the term of this patent is extended or adjusted under 35 U.S.C. 154(b) by 753 days.

(21) Appl. No.: 17/742,093

(22) Filed: May 11, 2022

(65) Prior Publication Data

US 2022/0365808 A1 Nov. 17, 2022

Related U.S. Application Data

(60) Provisional application No. 63/187,584, filed on May 12, 2021.

(51) Int. Cl.
*G06F 9/50* (2006.01)
*G06F 9/48* (2006.01)
(Continued)

(52) U.S. Cl.
CPC .......... *G06F 9/5044* (2013.01); *G06F 9/4881* (2013.01); *G06V 20/40* (2022.01);
(Continued)

(58) Field of Classification Search
CPC ................. G06F 9/5044; G06F 9/4881; G06F 2209/503; G06F 2209/485; G06F 704/233; G06V 20/40; G10L 25/57; G10L 25/84
See application file for complete search history.

(56) References Cited

U.S. PATENT DOCUMENTS

| | | | | |
|---|---|---|---|---|
| 7,738,866 B2 * | 6/2010 | Vitanov | ................. | G06F 9/5022 |
| | | | | 455/550.1 |
| 8,798,994 B2 * | 8/2014 | Eckhart | ................. | G10L 15/065 |
| | | | | 704/250 |

(Continued)

OTHER PUBLICATIONS

Lin et al., "Evaluation of CPU Utilization Under a Hardware-software Partitioned Environment (Migrating Software to Hardware)", ESA, pp. 222-228, 2007.

(Continued)

*Primary Examiner* — Fariba Sirjani
(74) *Attorney, Agent, or Firm* — Guntin & Gust, PLC; Atanu Das

(57) ABSTRACT

Computer-implemented methods, systems, and computer program products for controlling application feature processing based on central processing unit (CPU) usage and/or feature requirement to apply the application feature are disclosed. The computer-implemented method for controlling application feature processing based on central processing unit (CPU) usage to apply the application feature includes monitoring system metrics for availability of system resources; determining availability of system resources required to perform the particular application feature; determining if the particular application feature is to be applied based on the determination of the availability of system resources; and applying the particular application feature based on results of the determination of the availability of system resources.

33 Claims, 12 Drawing Sheets

100

(51) Int. Cl.
   G06V 20/40      (2022.01)
   G10L 25/57      (2013.01)
   G10L 25/84      (2013.01)
(52) U.S. Cl.
   CPC .............. G10L 25/57 (2013.01); G10L 25/84
             (2013.01); *G06F 2209/503* (2013.01)

(56)            References Cited

U.S. PATENT DOCUMENTS

| | | | | |
|---|---|---|---|---|
| 9,172,345 | B2 | 10/2015 | Kok | |
| 9,223,623 | B2 * | 12/2015 | Gujarathi | G06F 16/00 |
| 9,313,215 | B2 * | 4/2016 | Kalgi | H04L 63/1408 |
| 9,563,250 | B2 * | 2/2017 | Rychlik | G06F 1/324 |
| 10,031,000 | B2 | 7/2018 | Tripathi | |
| 10,264,999 | B2 | 4/2019 | Lacirignola | |
| 10,754,414 | B2 | 8/2020 | Hanson | |
| 11,321,181 | B2 * | 5/2022 | Kottomtharayil | G06F 9/505 |
| 12,174,948 | B2 * | 12/2024 | Wurster | G06F 21/79 |
| 2002/0133805 | A1 * | 9/2002 | Pugh | G06F 21/10 |
| | | | | 717/163 |
| 2004/0093295 | A1 * | 5/2004 | Burnett | G06Q 30/02 |
| | | | | 705/36 R |
| 2004/0148610 | A1 * | 7/2004 | Tsun | G06F 9/4843 |
| | | | | 718/102 |
| 2004/0185867 | A1 * | 9/2004 | Wassew | H04L 47/10 |
| | | | | 455/453 |
| 2006/0048135 | A1 * | 3/2006 | Hodson | G06F 9/50 |
| | | | | 717/121 |
| 2006/0064747 | A1 * | 3/2006 | Aaron | H04L 63/0428 |
| | | | | 726/13 |
| 2009/0074214 | A1 | 3/2009 | Bradford | |
| 2009/0198494 | A1 * | 8/2009 | Eckhart | G10L 15/065 |
| | | | | 704/E15.011 |
| 2011/0242422 | A1 * | 10/2011 | Hong | H04N 25/63 |
| | | | | 348/614 |
| 2013/0262680 | A1 * | 10/2013 | Gujarathi | G06F 16/00 |
| | | | | 709/226 |
| 2013/0276109 | A1 * | 10/2013 | Prakash | G06F 21/554 |
| | | | | 726/23 |
| 2015/0346001 | A1 * | 12/2015 | Tripathi | B60P 1/433 |
| | | | | 702/190 |
| 2016/0034380 | A1 * | 2/2016 | Shani | G06F 11/3466 |
| | | | | 717/172 |
| 2016/0117497 | A1 * | 4/2016 | Saxena | G06F 21/566 |
| | | | | 726/26 |
| 2017/0046120 | A1 | 2/2017 | Jeffery | |
| 2018/0067767 | A1 * | 3/2018 | Picinich | G06F 9/485 |
| 2018/0129529 | A1 * | 5/2018 | Boenig, II | G06F 11/3442 |
| 2018/0140233 | A1 * | 5/2018 | Lacirignola | A61B 5/6814 |
| 2018/0191589 | A1 * | 7/2018 | Chaabane | G06F 9/50 |
| 2019/0052728 | A1 * | 2/2019 | Cheng | H04L 67/62 |
| 2019/0079573 | A1 * | 3/2019 | Hanson | G11C 5/147 |
| 2020/0192734 | A1 * | 6/2020 | Kao | G06F 11/008 |
| 2021/0026651 | A1 * | 1/2021 | Bachmutsky | G06F 9/485 |
| 2024/0232653 | A1 * | 7/2024 | Horstman | G06N 20/00 |

OTHER PUBLICATIONS

Morbiwala et al. "A PC-based speech processor for cochlear implant fitting that can be adjusted in realtime" 48th Midwest Symposium on Circuits and Systems, 2005., pp. 1310-1313, Aug. 7, 2005.

* cited by examiner

100'

100

Monitor and analyze incoming and outgoing data in real time for an application — 102'

Determine if a particular application feature is required based on results of the analysis — 106'

Applying the particular application feature if it is determined that the the particular application feature is required — 112"

100"

200'

200

200"

300'

300

300"

400'

400

500

500'

500"

600

METHOD AND SYSTEM FOR CONTROLLING AN APPLICATION FEATURE BASED ON SYSTEM METRICS

CROSS-REFERENCE TO RELATED APPLICATIONS

Under 35 USC 119(e), this application claims priority to U.S. provisional application Ser. No. 63/187,584 entitled "METHOD AND SYSTEM FOR CONTROLLING AUDIO PROCESSING BASED ON CPU USAGE TO RESOLVE AUDIO QUALITY ISSUES", filed on May 12, 2021, which is incorporated herein by reference in its entirety.

FIELD OF THE INVENTION

The present invention relates generally to controlling an application feature based on system metrics and/or quality of data to resolve quality issues.

BACKGROUND

People are using a computer processor, a microphone, and a speaker to communicate with each other when they are not in the same physical location more and more. Human beings are easily distracted by background noises such as a baby crying, dogs barking, sirens and similar types of noises. Elimination of unwanted noise in the background when multiple people are talking to each other is a problem when using such technology. Additionally, computing or processing capacity may be limited which would impact the ability to eliminate the unwanted noise even when commercially available noise suppression technology is used.

SUMMARY

A computer-implemented method, system, and computer program product for controlling application feature processing based on central processing unit (CPU) usage and/or feature requirement to apply the application feature are disclosed.

In an example embodiment, the computer-implemented method for controlling application feature processing based on central processing unit (CPU) usage to apply the application feature includes monitoring system metrics for availability of system resources; determining availability of system resources required to perform the particular application feature; and determining if the particular application feature is to be applied based on the determination of the availability of system resources. If it is determined that the system resources are available to perform the particular application feature, the method applies the particular application feature.

In another embodiment, the computer-implemented method, further includes monitoring and analyzing incoming and outgoing data in real time for an application; determining if a particular application feature is required based on results of the analysis; determining if the particular application feature is to be applied based on the determination of the requirement of the particular application feature and the availability of system resources; and applying the particular application feature based on results of the determination of the requirement of the particular application feature in addition to the availability of system resources.

In an example embodiment, the system for controlling application feature processing based on central processing unit (CPU) usage to apply the application feature includes one or more user equipment, a monitoring application, at least one processor and memory, wherein the monitoring application monitors system metrics for availability of system resources; determines availability of system resources required to perform the particular application feature; and determines if the particular application feature is to be applied based on the determination of the availability of system resources. If it is determined that the system resources are available to perform the particular application feature, the system applies the particular application feature.

In another embodiment, the monitoring application further monitors and analyzes incoming and outgoing data in real time for an application; determines if a particular application feature is required based on results of the analysis; determines if the particular application feature is to be applied based on the determination of the requirement of the particular application feature and the availability of system resources; and applies the particular application feature based on results of the determination of the requirement of the particular application feature in addition to the availability of system resources.

In an example embodiment, the computer program product stored on a non-transitory computer readable medium for controlling application feature processing based on central processing unit (CPU) usage to apply the application feature, including computer readable instructions for causing a computer to control an execution of an application for controlling application feature processing based on CPU usage to apply the application feature including: monitoring system metrics for availability of system resources; determining availability of system resources required to perform the particular application feature; and determining if the particular application feature is to be applied based on the determination of the availability of system resources. If it is determined that the system resources are available to perform the particular application feature, the application applies the particular application feature.

In another embodiment, the computer program product further includes instruction for monitoring and analyzing incoming and outgoing data in real time for an application; determining if a particular application feature is required based on results of the analysis; determining if the particular application feature is to be applied based on the determination of the requirement of the particular application feature and the availability of system resources; and applying the particular application feature based on results of the determination of the requirement of the particular application feature in addition to the availability of system resources.

In yet another embodiment, the computer-implemented method for controlling application feature processing based on feature requirement includes analyzing incoming and outgoing data in real time; determining if a particular application feature is required based on results of the analysis; and applying the particular application feature based on results of the determination of the requirement of the particular application feature.

In yet another embodiment, the system for controlling application feature processing based on feature requirement to apply the application feature includes one or more user equipment, a monitoring application, at least one processor and memory, wherein the monitoring application monitors and analyzes incoming and outgoing data in real time; determines if a particular application feature is required based on results of the analysis; and applies the particular application feature based on results of the determination of the requirement of the particular application feature.

In yet another embodiment, the computer program product stored on a non-transitory computer readable medium for controlling application feature processing based on feature requirement to apply the application feature, including computer readable instructions for causing a computer to control an execution of an application for controlling application feature processing based on feature requirement to apply the application feature including: analyzing incoming and outgoing data in real time; determining if a particular application feature is required based on results of the analysis; and applying the particular application feature based on results of the determination of the requirement of the particular application feature.

In one or more embodiments, a computer-implemented method, system and computer program product for controlling audio processing based on CPU usage and/or quality of audio to resolve audio quality issues are disclosed.

In one or more embodiments, a computer-implemented method, system and computer program product for controlling video processing based on CPU usage and/or quality of video to resolve video quality issues are disclosed.

In one or more embodiments, a computer-implemented method, system and computer program product for controlling data transfer based on CPU usage and/or type of data in the data transfer to resolve data transfer quality issues are disclosed.

DETAILED DESCRIPTION

Figures 1A, 1B:
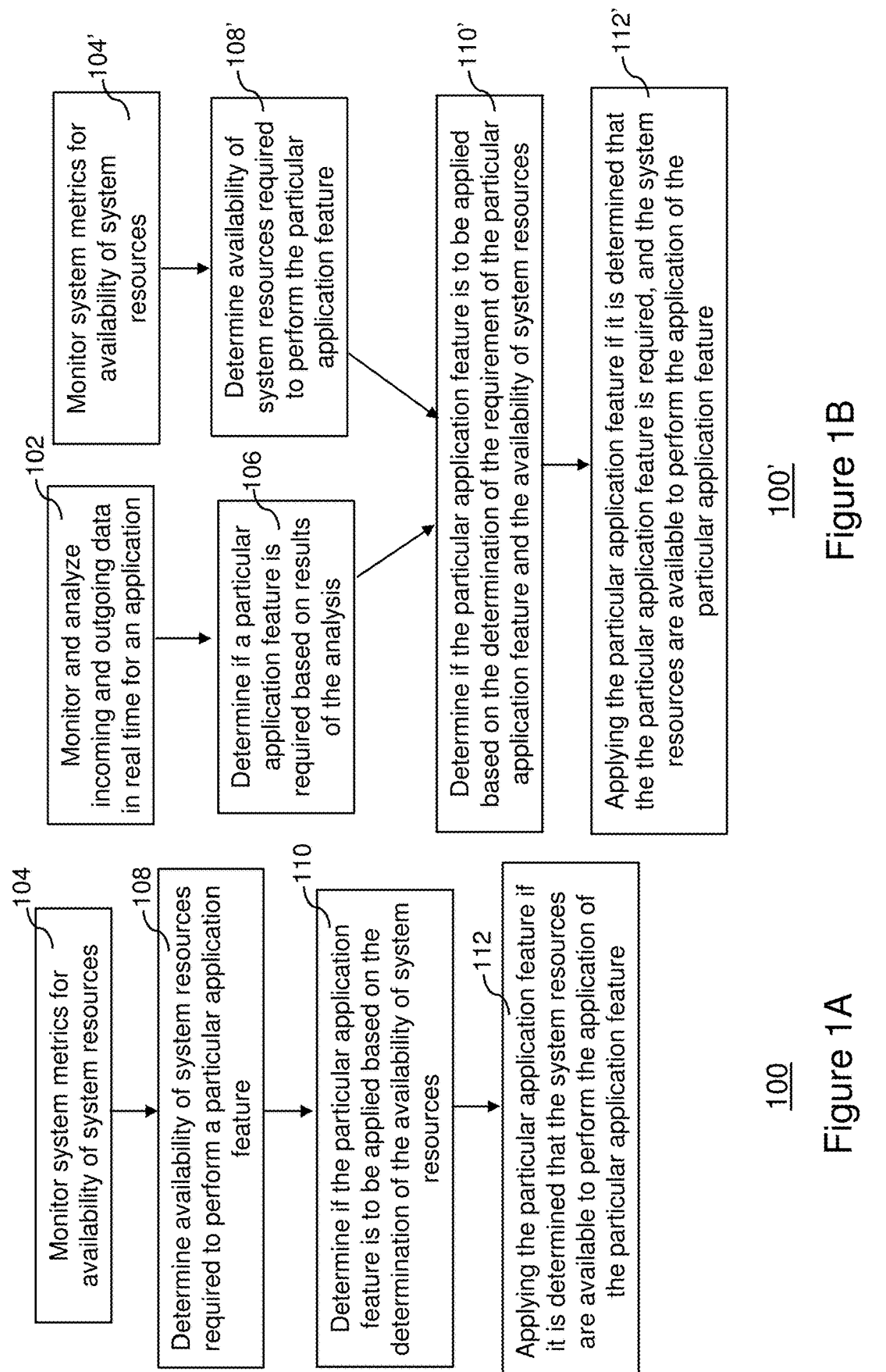
FIGS. 1A, 1B and 1C illustrate exemplary overviews of processes 100, 100' and 100" for controlling application feature processing based on central processing unit (CPU) usage and/or feature requirement to apply the application feature in accordance with one or more embodiments of the present invention.

The present invention relates generally to controlling an application feature based on system metrics and/or quality of data to resolve quality issues.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to product such as a noise suppression technology in audio processing, as used herein the term "product" is intended to be inclusive, interchangeable, and/or synonymous with appliances, electronic modules, telephony equipment and other similar products that require noise suppression technology in audio, audio and or visual correction technology in video (audio-visual) or a feature that requires correction in other data transfer/exchange technologies that send and receive data over a communications network where excessive noise, distortion, etc., may result in unclear reception of data, or excessive CPU usage may result in slowing the process of data transfer for that product, one will recognize that functionally different types of products may have characteristics, functions and/or operations which may be specific to their individual capabilities.

Additionally, a person skilled in the art may readily understand that this invention may be used with any software product for dynamically modifying the behavior of any software feature based on CPU usage.

People are using a computer processor, a microphone, and a speaker to communicate with each other when they are not in the same physical location more and more. Human beings are easily distracted by background noises such as crying, dogs barking, sirens and similar types of noises. Elimination of unwanted noise in the background when multiple people are talking to each other is a problem when using such technology. Additionally, computing or processing capacity may be limited and hence would impact the ability to eliminate the unwanted noise even when commercially available noise suppression technology is used.

Accordingly, what are needed are system and method to address the above identified issues. The present invention addresses such a need.

The method, system and computer program product described herein may eliminate the need for humans to have to mute themselves or other individuals on calls, and would make their voice clearer when they are talking. The method, system, and computer program product described herein may be used with conference call applications on PC's and Macs. It may also be used for other machines that have voice capabilities, such as ATMs, automobiles, ticket machines, or a setting where a person is trying to talk to someone remotely and there is a need to eliminate background noise.

To describe the features of the present invention in more detail within the context of controlling application feature processing based on central processing unit (CPU) usage and/or feature requirement to apply a particular application feature, for example, noise suppression technology, video clearing technology and data transfer technology, refer to the accompanying figures in conjunction with the following discussions. These examples are used for purpose of illustration only, and should not be construed as limitations.

A computer-implemented method, system, and computer program product for controlling application feature processing based on central processing unit (CPU) usage and/or feature requirement to apply the application feature are disclosed.

In an example embodiment, the computer-implemented method for controlling application feature processing based on central processing unit (CPU) usage to apply the application feature includes monitoring system metrics for availability of system resources; determining availability of system resources required to perform the particular application feature; and determining if the particular application feature is to be applied based on the determination of the availability of system resources. If it is determined that the system resources are available to perform the particular application feature, the method applies the particular application feature.

In another embodiment, the computer-implemented method, further includes monitoring and analyzing incoming and outgoing data in real time for an application; determining if a particular application feature is required based on results of the analysis; determining if the particular application feature is to be applied based on the determination of the requirement of the particular application feature and the availability of system resources; and applying the particular application feature based on results of the determination of the requirement of the particular application feature in addition to the availability of system resources.

In an example embodiment, the system for controlling application feature processing based on central processing unit (CPU) usage to apply the application feature includes one or more user equipment, a monitoring application, at least one processor and memory, wherein the monitoring application monitors system metrics for availability of system resources; determines availability of system resources required to perform the particular application feature; and determines if the particular application feature is to be applied based on the determination of the availability of system resources. If it is determined that the system resources are available to perform the particular application feature, the system applies the particular application feature.

In another embodiment, the monitoring application further monitors and analyzes incoming and outgoing data in real time for an application; determines if a particular application feature is required based on results of the analysis; determines if the particular application feature is to be applied based on the determination of the requirement of the particular application feature and the availability of system resources; and applies the particular application feature based on results of the determination of the requirement of the particular application feature in addition to the availability of system resources.

In an example embodiment, the computer program product stored on a non-transitory computer readable medium for controlling application feature processing based on central processing unit (CPU) usage to apply the application feature, including computer readable instructions for causing a computer to control an execution of an application for controlling application feature processing based on CPU usage to apply the application feature including: monitoring system metrics for availability of system resources; determining availability of system resources required to perform the particular application feature; and determining if the particular application feature is to be applied based on the determination of the availability of system resources. If it is determined that the system resources are available to perform the particular application feature, the application applies the particular application feature.

In another embodiment, the computer program product further includes instruction for monitoring and analyzing incoming and outgoing data in real time for an application; determining if a particular application feature is required based on results of the analysis; determining if the particular application feature is to be applied based on the determination of the requirement of the particular application feature and the availability of system resources; and applying the particular application feature based on results of the determination of the requirement of the particular application feature in addition to the availability of system resources.

In yet another embodiment, the computer-implemented method for controlling application feature processing based on feature requirement includes analyzing incoming and outgoing data in real time; determining if a particular application feature is required based on results of the analysis; and applying the particular application feature based on results of the determination of the requirement of the particular application feature.

In yet another embodiment, the system for controlling application feature processing based on feature requirement to apply the application feature includes one or more user equipment, a monitoring application, at least one processor and memory, wherein the monitoring application monitors and analyzes incoming and outgoing data in real time; determines if a particular application feature is required based on results of the analysis; and applies the particular application feature based on results of the determination of the requirement of the particular application feature.

In yet another embodiment, the computer program product stored on a non-transitory computer readable medium for controlling application feature processing based on feature requirement to apply the application feature, including computer readable instructions for causing a computer to control an execution of an application for controlling application feature processing based on feature requirement to apply the application feature including: analyzing incoming and outgoing data in real time; determining if a particular application feature is required based on results of the analysis; and applying the particular application feature based on results of the determination of the requirement of the particular application feature.

In one or more embodiments, a computer-implemented method, system, and computer program product for controlling audio processing based on CPU usage and/or audio quality to resolve audio quality issues are disclosed.

In one or more embodiments, a computer-implemented method, system and computer program product for controlling video processing based on CPU usage and/or quality of video to resolve video quality issues are disclosed.

In one or more embodiments, a computer-implemented method, system and computer program product for controlling data transfer based on CPU usage and/or type of data in the data transfer to resolve data transfer quality issues are disclosed.

The method, system and computer program product described herein may be used in a conference call noise reduction application for use on PC's and Macs. It is also applicable to other types of machines that have the ability for voice calls, such as automobiles. All computer applications involve use of a certain level of available CPU power. CPU availability is therefore analyzed for any such application to modify its behavior based on the available CPU capacity.

The method(s), system(s) and computer program product (s) described herein may be used, for example, for video processing such as for adding and managing virtual background and/or video filters as part of conference calls in various modes, for example, aggressive/moderate/minimal processing modes, based on available system metrics, for example, CPU, Memory, etc.

Similarly, the method(s), system(s) and computer program product(s) described herein may be used, for example, for data transfer, where any devices uploading large amount of data to cloud may make use of the intelligence used in the method, system and computer program product to classify priority of data transfer based on type of data and send it immediately or send it later based on available system metrics, for example, CPU, Memory, etc. since uploads require more CPU/Memory, or any applications which require CPU intensive processing, interrupt-driven process- ing, etc. The prioritization may be based on time sensitivity of the data to be transferred to cloud, for example, machine learning of noise may require immediate transfer of noise data to the cloud if that particular noise issue is to be resolved during the ongoing audio session, whereas upload of data related to monitoring application use, operational metrics may be classified as low priority as it may not be time sensitive.

Although, the example embodiments described herein illustrate usage of noise suppression technology as an add- on program, the method, system and computer program product described herein may analyze system metrics (CPU/ processing power, memory, etc.) and decide what add-on to include in the data processing mechanism based on the system metrics (CPU/processing power, memory etc.) analysis as well as the application being used, for example, audio call, video call, data transfer etc. and may use com- mercially available libraries for development of the appli- cation as a complete package or may work in tandem with commercially available applications with such technologies.

A commercially available library may be defined as a collection of non-volatile resources used by computer pro- grams for software development and may include a collec- tion of implementations of behavior, written in terms of a language, that has a well-defined interface by which the behavior is invoked.

A commercially available application may be defined as computing software designed to carry out a specific task other than one relating to the operation of the computer itself, typically to be used by end-users.

Figure 1C:
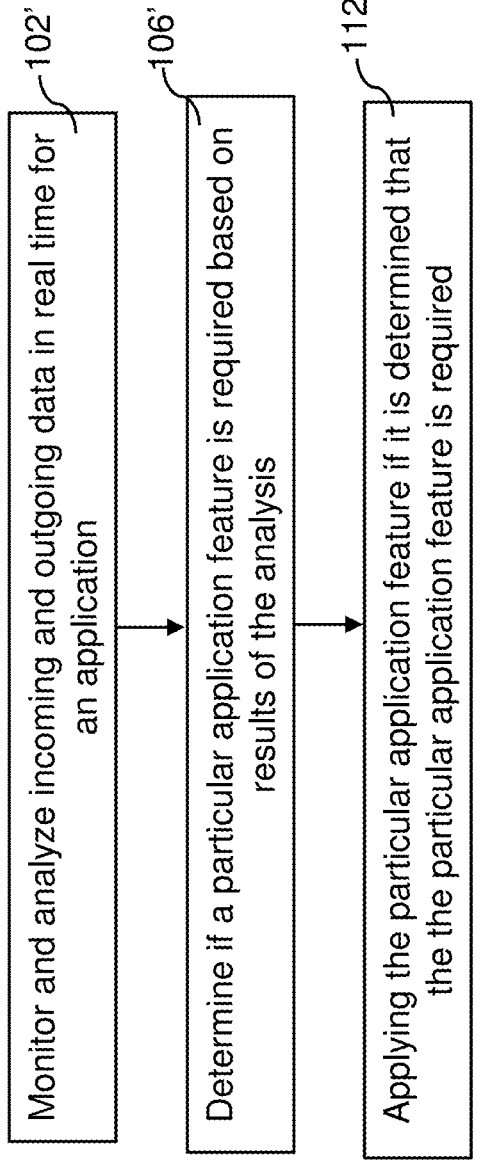

FIGS. 1A, 1B and 1C illustrate exemplary overview of processes 100, 100' and 100" for controlling application feature processing based on CPU usage and/or necessity to apply an application feature in accordance with one or more embodiments of the present invention. For example, the solution includes a monitoring application resident on hardware that contains a computer processor and other compo- nents necessary to run the monitoring application as well as other applications, such as a speaker, headphone or any similar audio output device, and audio input device such as a microphone, etc. for audio applications, or a speaker, a microphone and a camera for video applications etc. The monitoring application monitors data traffic, for example, sounds, visuals etc. in both directions.

The method, illustrated in FIG. 1A, for controlling appli- cation feature processing based on CPU usage to apply the application feature includes monitoring system metrics for availability of system resources like CPU/processing power usage, memory etc. to determine if there is enough capacity to perform the particular application feature if applied via step 104; determining availability of system resources required to perform the particular application feature via step 108; and determining if the particular application fea- ture is to be applied based on the determination of the availability of system resources via step 110. If it is deter- mined that the system resources are available to perform the particular application feature, the method applies the par- ticular application feature via step 112.

The monitoring application may support a number of modes, also referred to herein as different levels of process- ing, for example, three modes such as aggressive processing mode, moderate processing mode and minimal processing or bypass mode, and may intelligently choose an appropriate mode based amount of noise detected and/or availability of processing power to process the audio signal in real time and transmit processed audio to the networking function to pass the data to a destination, which may be cloud or another user environment of a remote individual as shown below in Table 1.

TABLE 1

| Modes | Description | CPU Usage Capacity Range |
|---|---|---|
| Aggressive Processing Mode | Application feature will be applied aggressively | Upper Bound: 70% Lower Bound: N/A |
| Moderate Processing Mode | Application feature will be applied but not as effective as aggressive | Upper Bound: 80% Lower Bound: 70% |
| Minimal Processing or Bypass Mode | Application feature will not be applied | Upper Bound: 85% Lower Bound: 80% |

The CPU usage capacity range described in Table 1 based on system metrics may be defined by the monitoring appli- cation based on the CPU capacity requirements of commer- cially available library(ies) and/or the particular application feature requirement for the data traffic. The upper bound and lower bound values used in Table 1 are for example only, and a person skilled in the art may readily understand that the Upper bound and lower bound may be defined as per application requirement providing the particular application feature.

The monitoring application may run for example, in user environment 1 and include a real-time application feature processor and system metrics monitor that monitors user environment system metrics, for example, CPU usage and memory available for feature processing. The monitoring application is provided with rules for processing features based on availability of system metrices for feature process- ing. The monitoring application may run a job internally which monitors the CPU regularly, and based on current usage, monitoring application may choose the right feature application mode to process the feature. CPU usage may fluctuate in the system under test. Rapid switching between modes may often result in bad user experience. As a result, additional algorithms may be incorporated. For example, the monitoring application may follow the algorithm below to decide when to change the mode:

Switch Mode if (X–Y) %>B % continuously for 20 seconds.

When moderate processing mode or minimal processing mode such as bypass mode is chosen, CPU monitor will go to sleep mode for 300 seconds. (Bypass mode requires no processing or minimal processing and hence no application of the application feature).

Once monitor wakes up, Switch mode if (X−Y) %<A % continuously for 20 seconds.

Where, overall CPU usage=X %; Monitoring Application CPU Usage=Y %; Lower bound of Mode=A %; and Upper bound of Mode=B %. The time values in seconds described herein are for example only, and a person skilled in the art may readily understand that other time values may be defined as per application requirement providing the particular application feature.

Although the invention is described herein using user environment 1 as an example, a person skilled in the art may readily understand that any user environment with the monitoring application installed therein is within the spirit and scope of the present invention.

Additionally, in an embodiment, the algorithm may use hysteresis in the CPU usage capacity boundary value, using a delta offset from the boundary value to switch from one mode to another, that is dependent on the "direction" of the mode change. For example, if operating in Moderate Processing Mode, the actual value used to switch to Aggressive Processing Mode may be selected at 69% (nominally 70% as shown in Table 1 minus a delta of 1%), and the CPU Usage Capacity value used to switch back to Moderate Processing Mode may be set at 72% (nominally 70% as shown in Table 1 plus a delta of 2%). These hysteresis delta values (zero, positive, or negative), which could be different for each Mode boundary, are for example only, and a person skilled in the art may readily understand that the values and the deltas may be defined as per application requirement providing the particular application feature.

Although the invention is described as using three modes of behavior, a person skilled in the art may readily understand that this invention may provide a number of modes also referred to herein as number of processing levels, as designed by the developer to dynamically modify the behavior of the application feature based on availability of system metrics, for example, CPU for usage.

In an embodiment, the monitoring application may also monitor data, for example, audio data, video data or other data to be transferred. The logical flow may be: Step 1. data transfer begins from one component in the system to one or more other components in the system; Step 2. In an embodiment, the real-time data processor inside the monitoring application may monitor and analyze the data in real time to identify noise or other issues with the data to be transferred such as reduced speed etc. and determine if there is noise or other issues that rise to a level where they should be eliminated; Step 3. the metrics monitor job inside the monitoring application monitors the system metrics like CPU usage, memory, disk space, etc. to determine if there is enough capacity to perform the noise reduction or resolve other quality issues related to the data transfer; Step 4. if noise reduction and/or resolution of other quality issues related to the data transfer are not required and/or there is not enough CPU and/or other system resources such as memory, disk space, etc. are available for the application, the unprocessed data, for example, audio data, video data or other data is transmitted to the networking function and passed to the destination; Step 5. If noise reduction is required, and there is enough CPU capacity, based on available CPU capacity and/or other system resources such as memory, disk space, etc. the monitoring application makes an intelligence choice of noise elimination or quality issue resolution mode.

The process is similar in reverse and may take place in another user environment, for example, user environment 2, when the data is to be sent from user environment 2 to a destination similar to the process described in detail in description accompanying FIG. 2B below in steps 6 to 10.

Thus, as illustrated in FIG. 1B, the method for controlling application feature processing based on CPU usage to apply the application feature may further include determination of necessity of applying the application feature. Thus, in an embodiment, the method further includes monitoring and analyzing incoming and outgoing data in real time for an application via step 102; determining if a particular application feature is required based on results of the analysis via step 106; determining if the particular application feature is to be applied based on the determination of the requirement of the particular application feature and the availability of system resources via step 110'; and applying the particular application feature based on results of the determination of the requirement of the particular application feature in addition to the availability of system resources via step 112'.

Alternatively, in an embodiment, as illustrated in FIG. 1C, the computer-implemented method for controlling application feature processing based on feature requirement includes analyzing incoming and outgoing data in real time via step 102'; determining if a particular application feature is required based on results of the analysis via step 106'; and applying the particular application feature based on results of the determination of the requirement of the particular application feature via step 112".

Additionally, in an embodiment, the monitoring application may read the user environment system configurations including but not limited to number of available cores & RAM, which may be done at the time of installation of the monitoring application, or at a later time, to begin with an appropriate processing mode. For example, if a user environment system configuration includes one core and/or smaller RAM, the monitoring application may decide to start with the application in Minimal Processing or Bypass Mode. Similarly, if a user environment system configuration includes four cores and/or larger RAM, the monitoring application may decide to start with the application in Aggressive Processing Mode, etc. Additionally, or alternatively, the monitoring application, during the installation of the application may prompt the installer to optionally override default processing mode identified by the application from user environment configuration.

Although the invention is described herein using user environment 1 as an example, a person skilled in the art may readily understand that any user environment with the monitoring application installed therein is within the spirit and scope of the present invention.

Figure 5A:
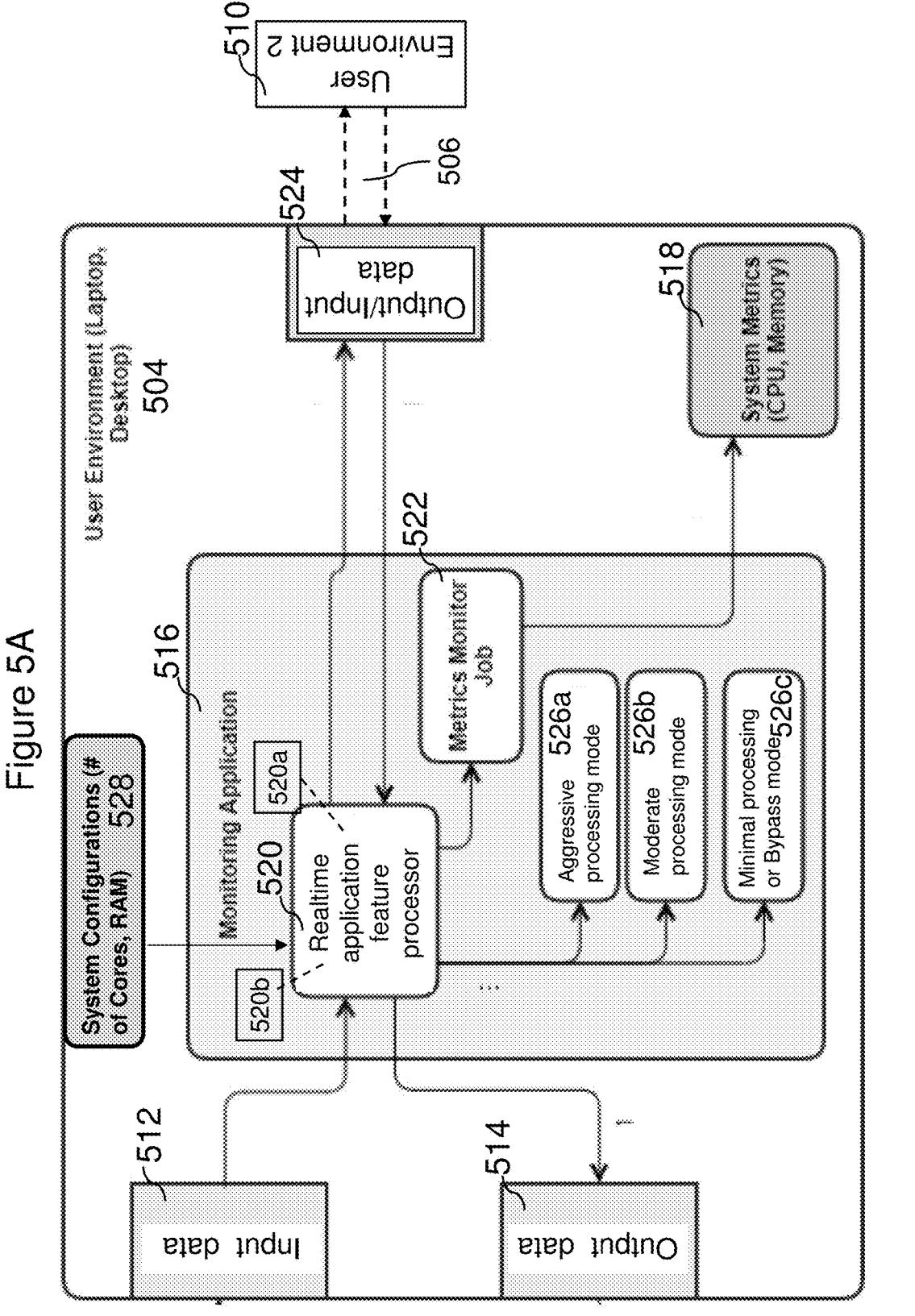
FIG. 5A illustrates an exemplary overview of system 500 for controlling application feature processing based on central processing unit (CPU) usage and/or feature requirement to apply the application feature in accordance with one or more embodiments of the present invention.

The system and components of the system used for carrying out the processes described herein is illustrated in FIG. 5A and is described in detail along with their functions in the description accompanying FIG. 5A.

Figures 3A, 3B:
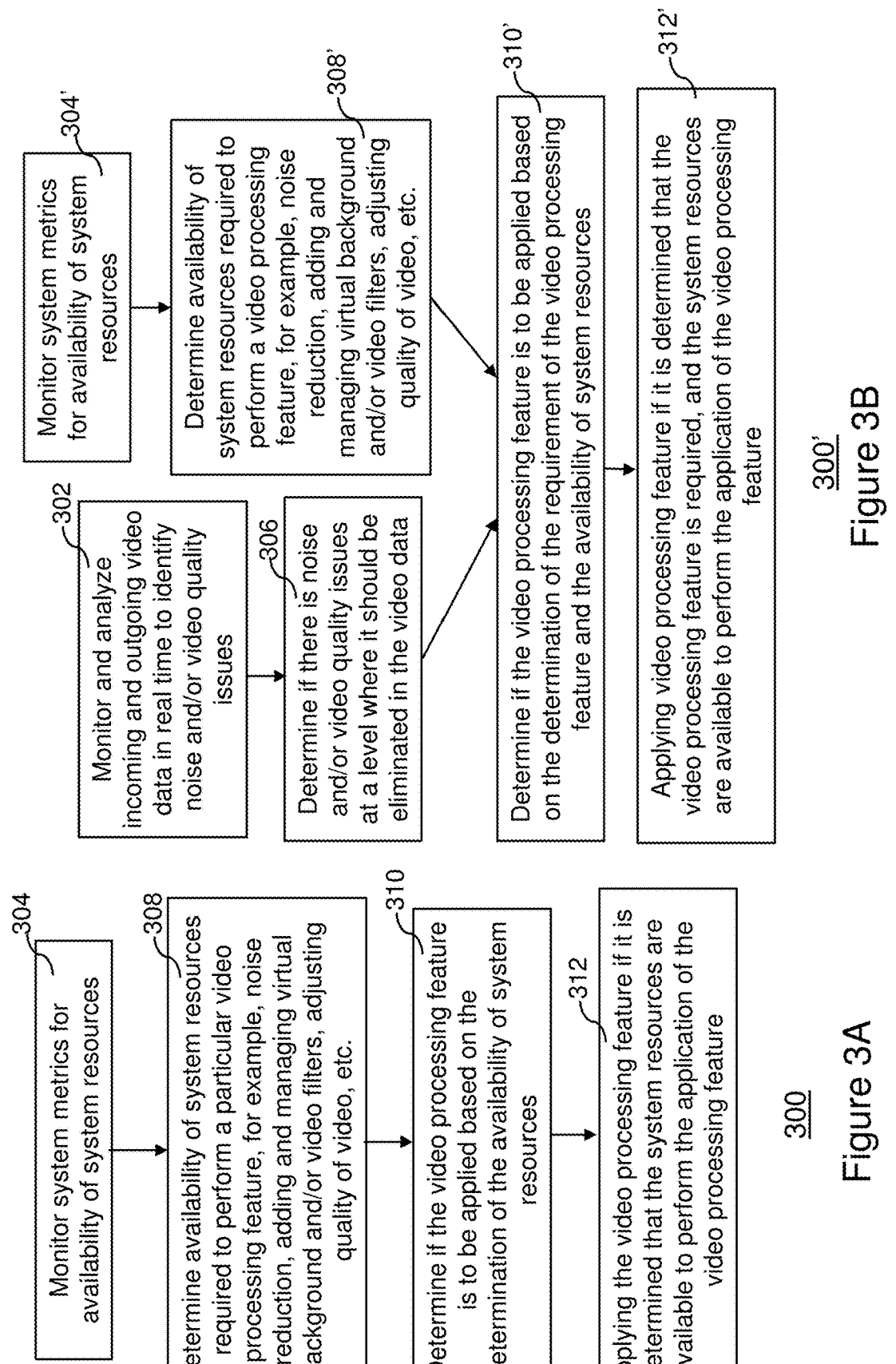
FIGS. 3A, 3B and 3C illustrate exemplary overviews of processes 300, 300' and 300" for controlling video processing based on central processing unit (CPU) usage and/or video quality to resolve video quality issues in accordance with one or more embodiments of the present invention.
Figure 3C:
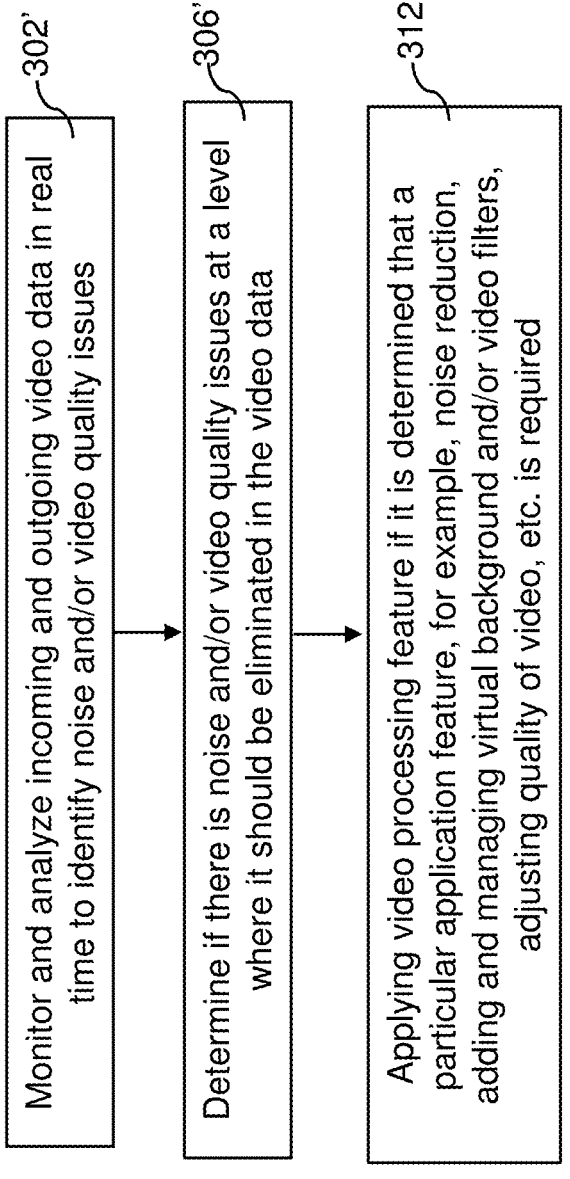

The method(s), system(s) and computer program product(s) described herein may be used, various applications including video processing, data transfer, etc. For example, in case of video processing, for adding and managing virtual background and/or video filters as part of conference calls in various processing modes, for example, aggressive/moderate/minimal processing modes, based on available CPU/Memory, etc. as illustrated in FIGS. 3A, 3B and 3C.

Similarly, for applications involving data transfer, devices uploading large amount of data to cloud may make use of the intelligence used in the method, system and computer program product to classify priority of data transfer based on type of data and send it immediately or send it later based on available CPU/Memory, since uploads require more CPU/

11

Figures 4A, 4B:
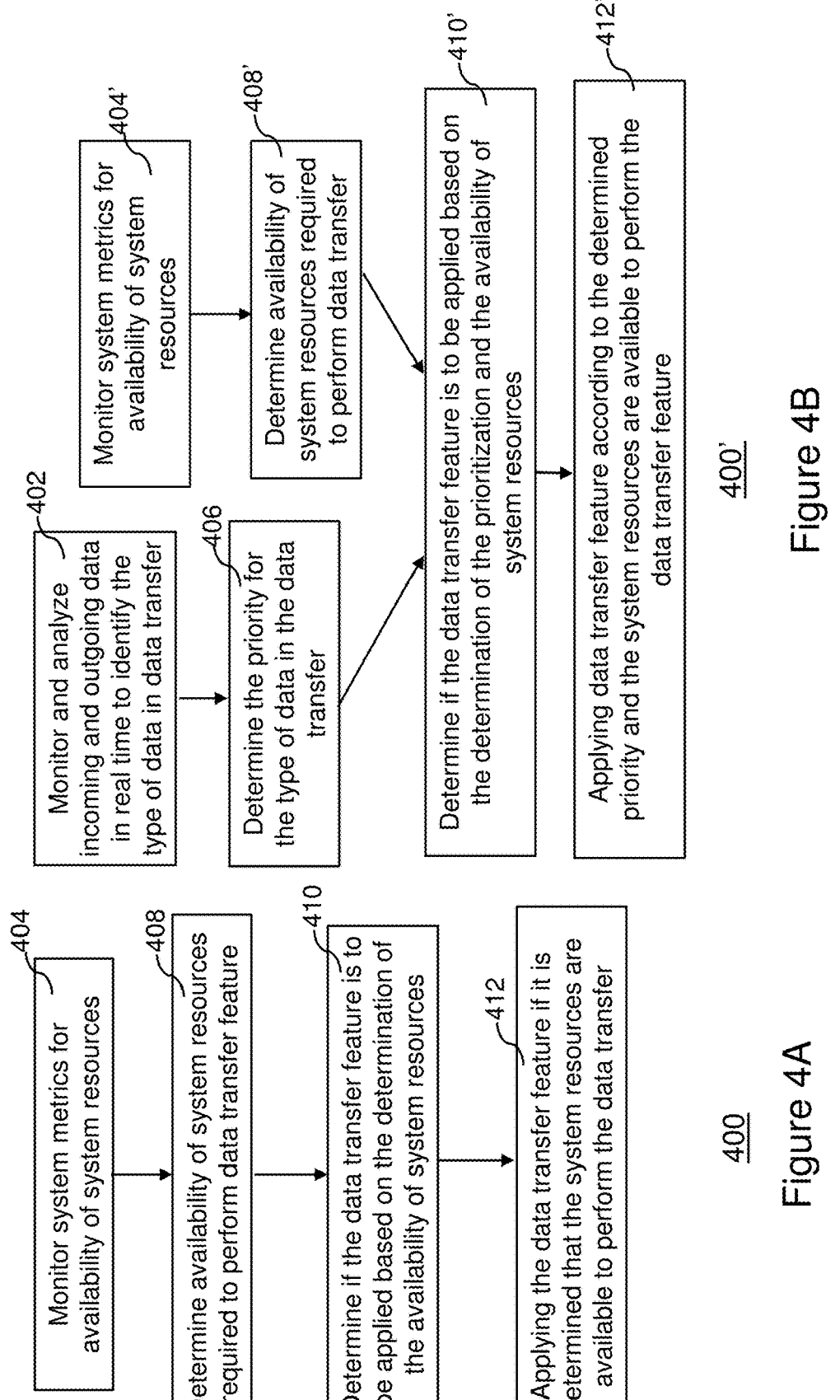
FIGS. 4A, 4B and 4C illustrate exemplary overviews of processes 400, 400' and 400" for controlling data transfer processing based on central processing unit (CPU) usage and/or type of data in the data transfer to resolve data transfer quality issues in accordance with one or more embodiments of the present invention.
Figure 4C:
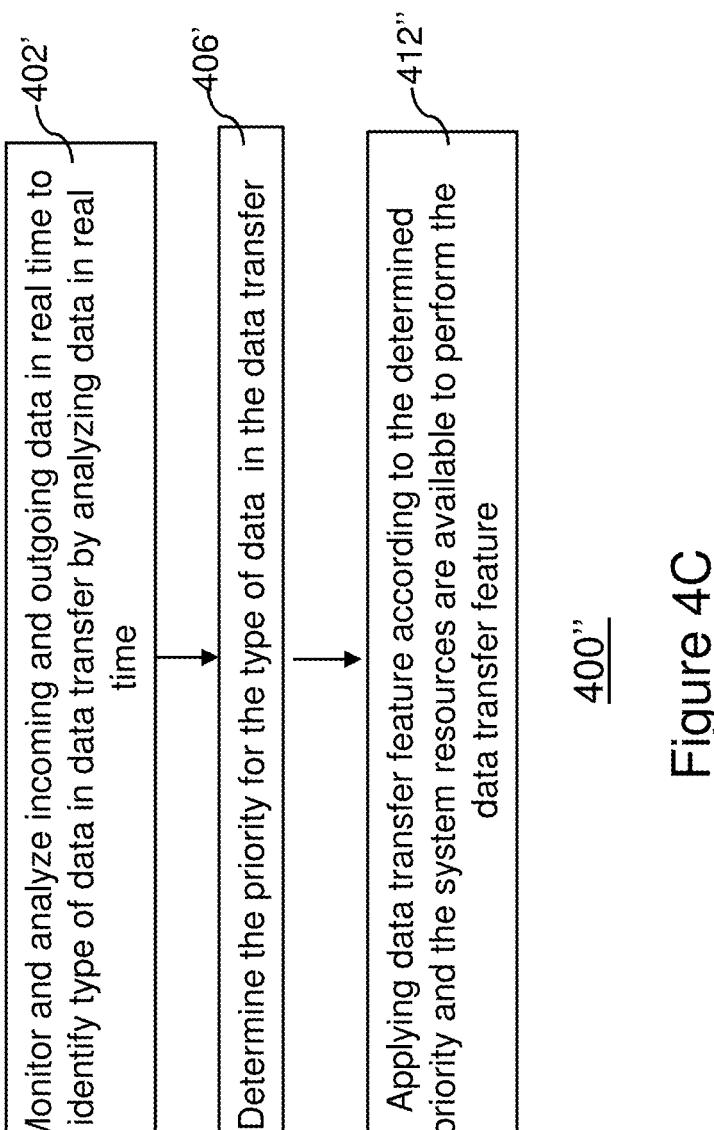

Memory, or any applications which require CPU intensive processing, interrupt-driven processing, etc. as illustrated in FIGS. 4A, 4B and 4C. The prioritization may be based on time sensitivity of the data to be transferred to cloud, for example, machine learning of noise may require immediate transfer of noise data to the cloud if that particular noise issue is to be resolved during the ongoing audio session, whereas upload of data related to monitoring application use, operational metrics may be classified as low priority as it may not be time sensitive. In another example such as in case of motion sensor camera, the camera captures events and sends data to cloud. In such cases, the application can prioritize the transfer of data based on type of data, for example, if there is no motion, but just pictures, then the application may decide not to transfer that data immediately, as the application may decide that this type of data is not high priority data. However, if there is motion, the application may decide that this type of data is high priority data and may decide to transfer that data immediately.

Similar to other application features described herein, prioritization of data for data transfers may also be performed in various processing modes, for example, aggressive/moderate/minimal processing modes, based on available CPU/Memory, etc. as illustrated in FIGS. 4A, 4B and 4C.

Figures 2A, 2B:
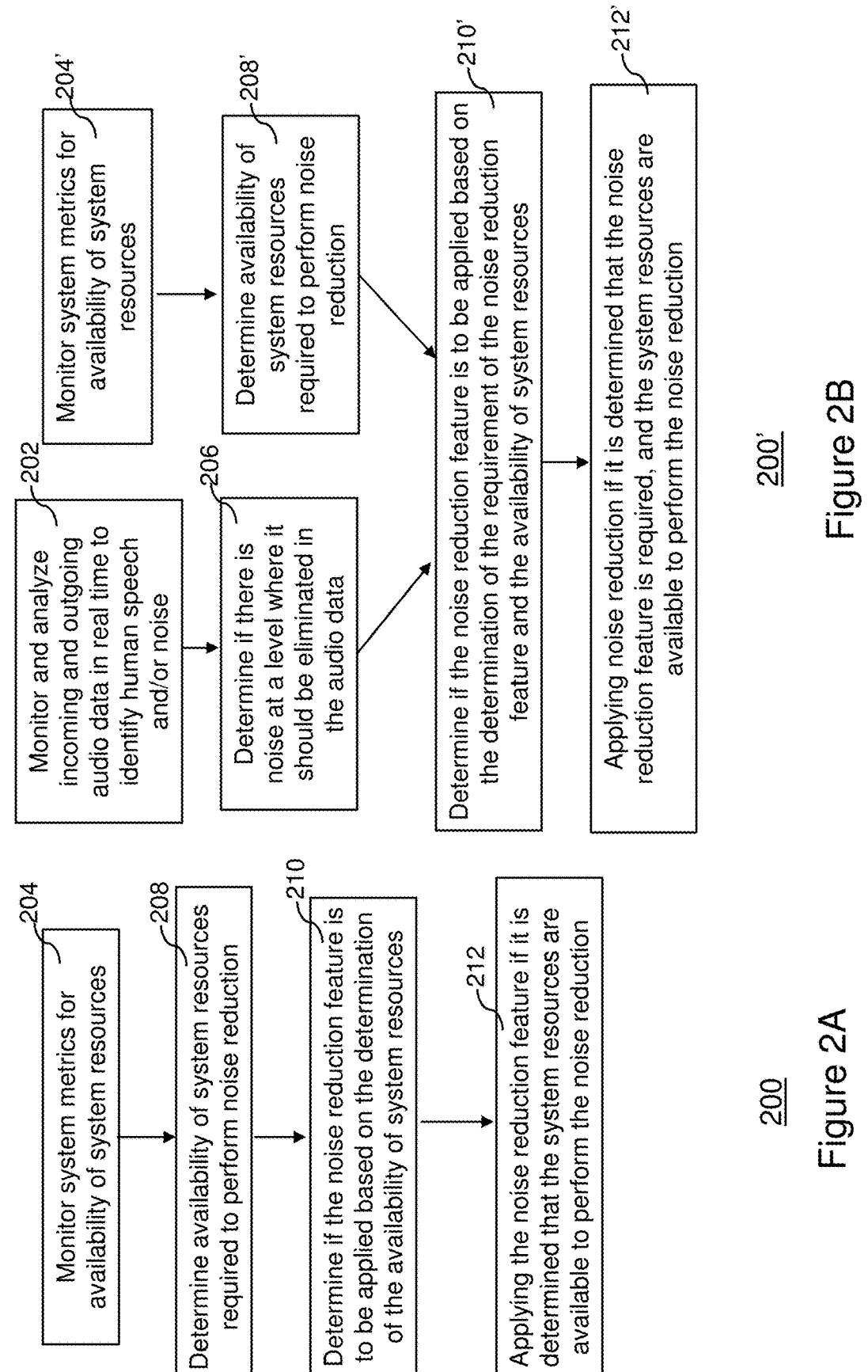
FIGS. 2A, 2B and 2C illustrate exemplary overviews of processes 200, 200' and 200" for controlling audio processing based on central processing unit (CPU) usage and/or audio quality to resolve audio quality issues in accordance with one or more embodiments of the present invention.
Figure 2C:
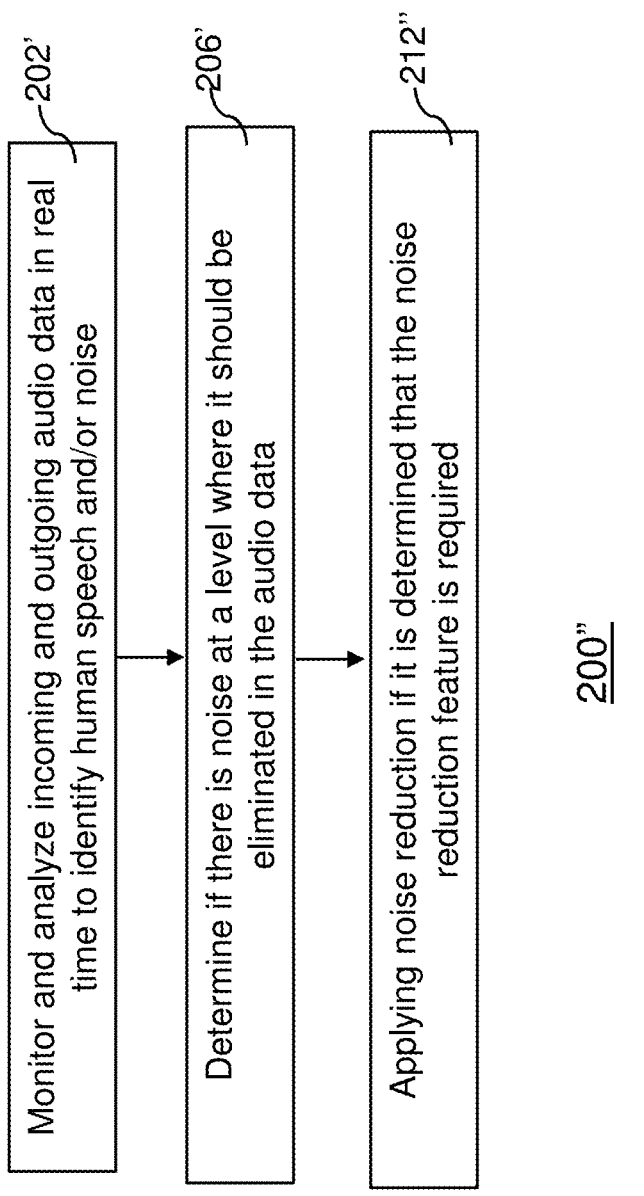

FIGS. 2A, 2B and 2C illustrate exemplary overviews of processes 200, 200' and 200" for controlling audio processing based on CPU usage and/or audio quality to resolve audio quality issues in accordance with one or more embodiments of the present invention. For example, the solution includes a monitoring application resident on hardware that contains a computer processor, and other components required to run other related applications such as an audio output device, for example, a speaker or headphones, and an audio input device, for example, a microphone, etc. for voice application.

In an embodiment, as illustrated in FIG. 2A, the computer-implemented method for controlling audio processing based on central processing unit (CPU) usage to resolve audio quality issues includes monitoring system metrics for availability of system resources via step 204; determining availability of system resources required to perform noise reduction via step 208; and determining if the noise reduction feature is to be applied based on the determination of the availability of system resources via step 210. If it is determined that the system resources are available to perform the noise reduction feature, the system applies the noise reduction feature via step 212.

The monitoring application may support a number of modes, for example, three modes such as aggressive processing mode, moderate processing mode and minimal processing or bypass mode, and may intelligently choose an appropriate mode based on the amount of noise detected and/or availability of processing power to process the audio signal in real time and transmit processed audio to the networking function to pass the audio signal to a destination, which may be another user environment of a remote individual as shown below in Table 2.

TABLE 2

| Modes | Description | CPU Usage Capacity Range |
|---|---|---|
| Aggressive Processing Mode | Noise will be removed completely, and outcome will be the clean speech | Upper Bound: 70% Lower Bound: N/A |

12

TABLE 2-continued

| Modes | Description | CPU Usage Capacity Range |
|---|---|---|
| Moderate Processing Mode | Noise will be removed but not as effective as aggressive | Upper Bound: 80% Lower Bound: 70% |
| Minimal Processing or Bypass Mode | Noise will not be removed | Upper Bound: 85% Lower Bound: 80% |

The CPU usage capacity range described in Table 2 based on system metrics may be defined by the monitoring application based on the CPU capacity requirements of commercially available library(ies) and/or the particular application feature requirement for the data traffic. The upper bound and lower bound values used in Table 2 are for example only, and a person skilled in the art may readily understand that the Upper bound and Lower bound may be defined as per application requirement providing the particular application feature.

The monitoring application may run a job internally which monitors the CPU usage regularly, and based on current CPU usage, the monitoring application may choose the right noise elimination mode to process the audio. CPU usage may fluctuate in the system under test. Rapid switching between modes may often result in bad user experience. As a result, additional algorithms may be incorporated. For example, the monitoring application may follow the algorithm below to decide when to change the mode:

Switch Mode if (X–Y) %>B % continuously for 20 seconds.

When moderate processing mode or minimal processing mode such as bypass mode is chosen, CPU monitor will go to sleep mode for 300 seconds. (Bypass mode requires no processing or minimal processing and hence no application of the application feature).

Once monitor wakes up, Switch mode if (X–Y) %<A % continuously for 20 seconds.

Where, overall CPU usage=X %; Monitoring Application CPU Usage=Y %; Lower bound of Mode=A %; and Upper bound of Mode=B %. The time values in seconds described herein are for example only, and a person skilled in the art may readily understand that other time values may be defined as per application requirement providing the particular application feature.

Additionally, the algorithm may use hysteresis in the CPU usage capacity boundary value, using a delta offset from the boundary value to switch from one mode to another, that is dependent on the "direction" of the mode change. For example, if operating in Moderate Processing Mode, the actual value used to switch to Aggressive Processing Mode may be selected at 69% (nominally 70% as shown in Table 2 minus a delta of 1%), and the CPU Usage Capacity value used to switch back to Moderate Processing Mode may be set at 72% (nominally 70% as shown in Table 2 plus a delta of 2%). These hysteresis delta values (zero, positive, or negative), which could be different for each Mode boundary, are for example only, and a person skilled in the art may readily understand that the values and the deltas may be defined as per application requirement providing the particular application feature.

Although the invention is described as using three modes of behavior, a person skilled in the art may readily understand that this invention may provide a number of modes also referred to herein as number of processing levels, as designed by the developer to dynamically modify the behavior of the application feature based on availability of system metrics, for example, CPU for usage.

In an embodiment, the monitoring application may also monitor data, for example, sounds in both directions. The logical flow may be: Step 1. an individual is speaking into their microphone; Step 2. In an embodiment, the real-time audio processor inside the monitoring application may monitor and analyze the audio in real time to identify human speech and determine if there are other noises that rise to a level where they should be eliminated; Step 3. the metrics monitor job inside the monitoring application monitors the system metrics like CPU usage, memory, disk space, etc. to determine if there is enough capacity to perform the noise reduction; Step 4. if noise reduction is not required and/or there is not enough CPU available for the application, the unprocessed audio signal is transmitted to the networking function and passed to the remote user over internet; Step 5. if noise reduction is required, and there is enough CPU capacity, based on available CPU capacity, the monitoring application makes an intelligence choice of noise elimination mode.

The process is similar in reverse when the remote individual is speaking, for example, Step 6. the remote user is speaking into their microphone and the audio signal is received via the networking function; Step 7. the real-time audio processor inside the monitoring application may analyze the audio in real time to identify human speech and determine if there are other noises that rise to a level where they should be eliminated; Step 8. the metrics monitor job inside the monitoring application monitors the system metrics like CPU utilization, memory, disk space, etc. to determine if there is capacity to perform the noise reduction; Step 9. If no noise reduction is required, and/or there is not enough CPU capacity for the application, the unprocessed audio signal is transmitted to the audio output device such as speaker or headphones and passed to the remote individual; Step 10. If noise reduction is required and there is enough CPU capacity, based on available CPU capacity, the noise reduction algorithms process the audio signal in real time and transmit processed audio to the speaker to pass the audio signal to the remote individual. The noise reduction algorithm used here is similar to the one described above.

Additionally, the process may include detecting the origin of noise and based on that decide whether to turn on noise suppression for audio output device such as a speaker or for audio input device such as a microphone in a constrained environment. For example, if low CPU available and quiet on user 1 side, but loud from another source, then turn on speaker suppression, where-as if low CPU, quiet from other source, but loud background on user 1 side, then turn on microphone suppression.

Additionally or alternatively, the application may only go into full processing when a lot of background noise is detected, and otherwise remains in power save mode to save battery power and/or CPU capacity.

Thus, as illustrated in FIG. 2B, the method for controlling application feature processing based on CPU usage to apply the noise reduction feature may further include determination of necessity of applying the noise reduction feature. Thus, in an embodiment, the computer-implemented method for controlling audio processing based on CPU usage to resolve audio quality issues further includes monitoring and analyzing incoming and outgoing audio data in real time to identify human speech via step 202; determining if there is noise at a level where it should be eliminated in the audio data via step 206; determining if the noise reduction feature is to be applied based on the determination of the requirement of the noise reduction feature and the availability of system resources via step 210'. If it is determined that the noise reduction feature is required and the system resources are available to perform the noise reduction feature, the system applies the noise reduction feature via step 212'.

Alternatively, in an embodiment, as illustrated in FIG. 2C, the computer-implemented method for controlling audio processing based on audio quality to resolve audio quality issues includes monitoring and analyzing incoming and outgoing audio data in real time to identify human speech via step 202'; determining if there is noise at a level where it should be eliminated in the audio data via step 206'. If it is determined that the noise reduction feature is required, the system applies the noise reduction feature via step 212'.

Additionally, in an embodiment, the monitoring application may read the user environment system configurations including but not limited to number of available cores & RAM, which may be done at the time of installation of the monitoring application, or at a later time, to begin with an appropriate processing mode. For example, if a user environment system configuration includes one core and smaller RAM, the monitoring application may decide to start with application in Minimal Processing or Bypass Mode. Similarly, if a user environment system configuration includes four cores and larger RAM, the monitoring application may decide to start with application in Aggressive Processing Mode, etc. Additionally, or alternatively, the monitoring application, during the installation of the application may prompt the installer to optionally override default processing mode identified by the application from user environment configuration.

The system and components of the system used for carrying out the processes described herein is illustrated in FIGS. 5A and/or 5B and is described in detail along with their functions in the description accompanying FIGS. 5A and/or 5B.

FIGS. 3A, 3B and 3C illustrate exemplary overviews of processes 300, 300' and 300" for controlling video processing based on central processing unit (CPU) usage and/or video quality to resolve video quality issues in accordance with one or more embodiments of the present invention. The method described herein is similar to the method illustrated in FIGS. 1A, 1B and 1C, where the application includes video processing.

The method/s, system/s and computer program product/s described herein may be used for processing video data, for example, for adding and managing virtual background and/or video filters as part of conference calls in various processing modes or levels, for example, aggressive/moderate/minimal processing modes, based on available CPU/Memory is described in detail in description accompanying FIGS. 1A, 1B and 1C and FIG. 5C. Quality of video in conference calls may be adjusted with different pixel levels (High/Medium/Low) automatically based on the available CPU/Memory metrics available in the system.

In an embodiment, as illustrated in FIG. 3A, the computer-implemented method for controlling video processing based on central processing unit (CPU) usage to resolve video quality issues includes monitoring system metrics for availability of system resources via step 304; determining availability of system resources required to perform a particular video processing feature, for example, adding and managing virtual background and/or video filters and/or adjusting quality of video via step 308; and determining if the particular video processing feature is to be applied based on the determination of the availability of system resources via step 310. If it is determined that the system resources are available to perform the noise reduction feature, the system applies the noise reduction feature via step 312.

As illustrated in FIG. 3B, the method for controlling application feature processing based on CPU usage to apply the particular video processing feature may further include determination of necessity of applying a particular video processing feature. Thus, in an embodiment, the computer-implemented method for controlling audio processing based on CPU usage to resolve video quality issues further includes monitoring and analyzing incoming and outgoing audio data in real time to identify to identify noise and/or video quality issues via step 302; determining if the noise and/or video quality issues are at a level where it should be eliminated in the video data via step 306; determining if the video processing feature is to be applied based on the determination of the requirement of the video processing feature and the availability of system resources via step 310'. If it is determined that the video processing feature is required and the system resources are available to perform the video processing feature, the system applies the video processing feature via step 312'.

Alternatively, in an embodiment, as illustrated in FIG. 3C, the computer-implemented method for controlling video processing based on video quality to resolve video quality issues includes monitoring and analyzing incoming and outgoing video data in real time to identify noise and/or video quality issues via step 302'; determining if the noise and/or video quality issues are at a level where it should be eliminated in the video data via step 306'. If it is determined that the video processing feature is required, the system applies the video processing feature via step 312'.

Additionally, in an embodiment, the monitoring application may read the user environment system configurations including but not limited to number of available cores & RAM, which may be done at the time of installation of the monitoring application, or at a later time, to begin with an appropriate processing mode. For example, if a user environment system configuration includes one core and/or smaller RAM, the monitoring application may decide to start with application in Minimal Processing or Bypass Mode. Similarly, if a user environment system configuration includes four cores and/or larger RAM, the monitoring application may decide to start with application in Aggressive Processing Mode, etc. Additionally, or alternatively, the monitoring application, during the installation of the application may prompt the installer to optionally override default processing mode identified by the application from user environment configuration.

Figure 5B:
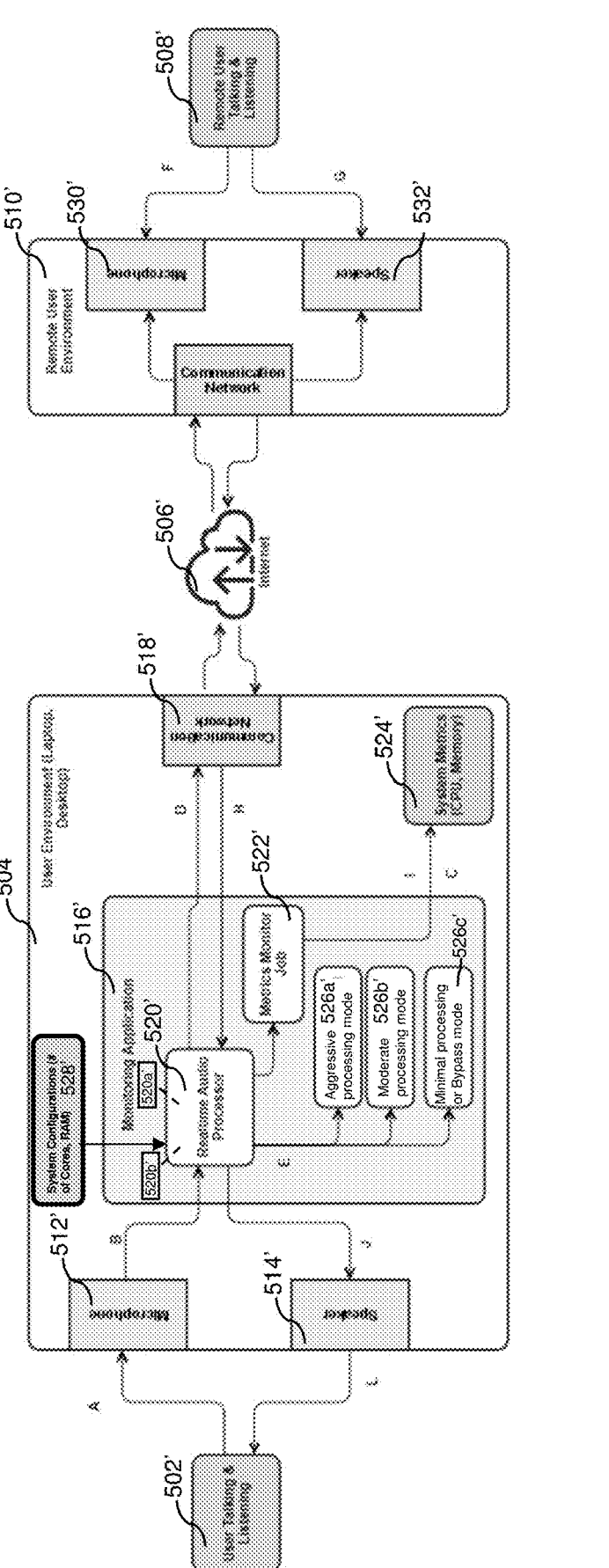
FIG. 5B illustrates an exemplary overview of system 500' for controlling audio processing based on central processing unit (CPU) usage and/or audio quality to resolve audio quality issues in accordance with one or more embodiments of the present invention.
Figure 5C:
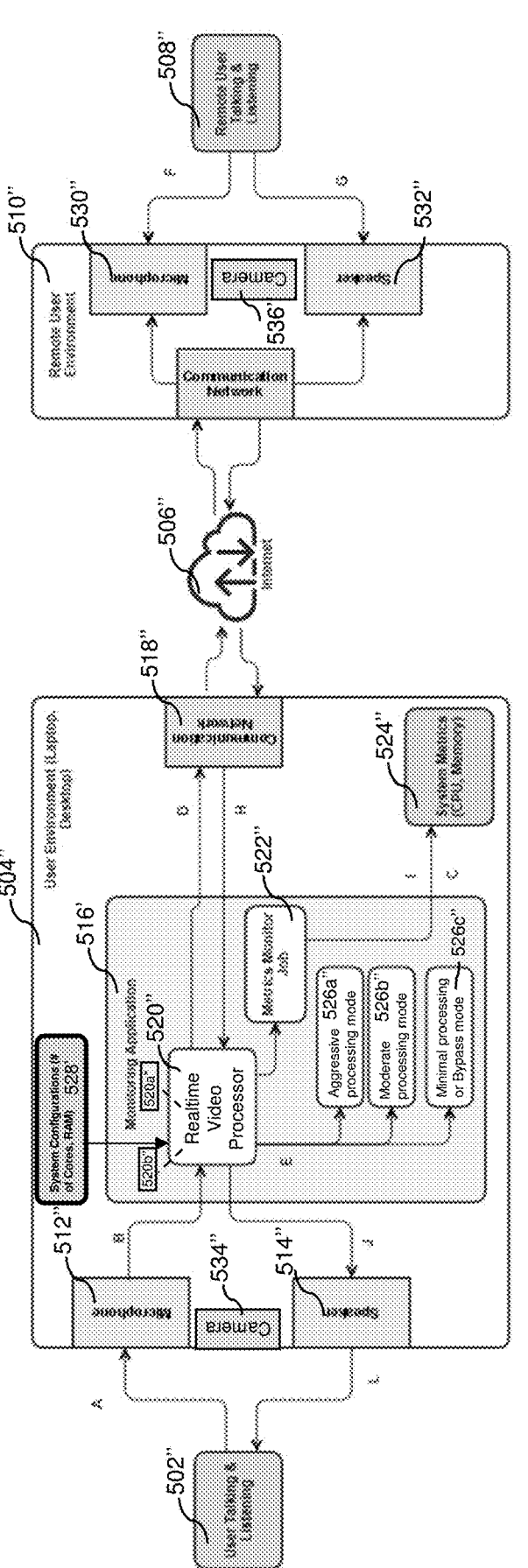
FIG. 5C illustrates an exemplary overview of system 500" for controlling video processing based on CPU usage and/or video quality to resolve video quality issues in accordance with one or more embodiments of the present invention.

The system and components of the system used for carrying out the processes described herein is illustrated in FIG. 5C and is described in detail along with their functions in the description accompanying FIG. 5C.

FIGS. 4A, 4B and 4C illustrate exemplary overviews of processes 400, 400' and 400" for controlling data transfer processing based on central processing unit (CPU) usage and/or data transfer quality to resolve data transfer quality issues in accordance with one or more embodiments of the present invention. The method described herein is similar to the method illustrated in FIGS. 1A, 1B and 1C, where the application includes data transfer processing, for example, analyzing data in real time to prioritize the transfer of data based on type of data.

The method/s, system/s and computer program product/s described herein may be used, for example, for any devices uploading large amount of data to cloud. The devices uploading and/or downloading large amount of data to cloud may make use of the intelligence used herein to classify priority of data transfer based on type of data and send it immediately or send it later based on available CPU/Memory, since uploads and/or downloads require more CPU/Memory, or any applications which require CPU intensive processing, interrupt-driven processing, etc. The prioritization may be based on time sensitivity of the data to be transferred to cloud, for example, machine learning of noise may require immediate transfer of noise data to the cloud if that particular noise issue is to be resolved during the ongoing audio session, whereas upload of data related to monitoring application use, operational metrics may be classified as low priority as it may not be time sensitive. In another example such as in case of motion sensor camera, the camera captures events and sends data to cloud. In such cases, the application can prioritize the transfer of data based on type of data, for example, if there is no motion, but just pictures, then the application may decide not to transfer that data immediately, as the application may decide that this type of data is not high priority data. However, if there is motion, the application may decide that this type of data is high priority data and may decide to transfer that data immediately.

Similar to other application features described herein, prioritization of data for data transfers may also be performed in various processing modes, for example, aggressive/moderate/minimal processing modes, based on available CPU/Memory, etc. as described in detail in description accompanying FIGS. 1A, 1B and 1C and FIG. 5A. Thus, once the prioritization is determined, the system may decide to upload all data (similar to aggressive mode), some data based on priority (similar to moderate mode), only high priority data or no data (similar to minimal processing mode), based on availability of system resources, for example, CPU usage, memory, etc.

In an embodiment, as illustrated in FIG. 4A, the computer-implemented method for controlling video processing based on central processing unit (CPU) usage includes monitoring system metrics for availability of system resources via step 404; determining availability of system resources required to perform data transfer feature via step 408; and determining if the data transfer feature is to be applied based on the determination of the availability of system resources via step 410. If it is determined that the system resources are available to perform the data transfer feature, the system applies the data transfer feature via step 412.

As illustrated in FIG. 4B, the method for controlling application feature processing based on CPU usage to apply the prioritization feature may further include determination of necessity of applying the prioritization feature. Thus, in an embodiment, the computer-implemented method for controlling data transfer processing based on CPU usage to resolve data transfer quality issues further includes monitoring and analyzing incoming and outgoing data in real time to identify the type of data in data transfer via step 402; determining the priority for the type of data in the data transfer via step 406 and determining if the data transfer feature is to be implemented based on the determination of the prioritization and the availability of system resources via step 410'. If it is determined that the data transfer feature is to be applied according to the determined priority and availability of the system resources to perform the data transfer feature, applying the data transfer feature via step 412'.

Alternatively, in an embodiment, as illustrated in FIG. 4C, the computer-implemented method for controlling application feature processing based on data transfer quality to resolve data transfer quality issues includes monitoring and analyzing incoming and outgoing data in real time to identify the type of data in data transfer via step 402' and determining the priority for the type of data in the data transfer via step 406'. If it is determined that the data transfer feature is to be applied according to the determined priority and availability of the system resources to perform the data transfer feature, applying the data transfer feature via step 412".

Additionally, in an embodiment, the monitoring application may read the user environment system configurations including but not limited to number of available cores & RAM, which may be done at the time of installation of the monitoring application, or at a later time, to begin with an appropriate processing mode. For example, if a user environment system configuration includes one core and/or smaller RAM, the monitoring application may decide to start with application in Minimal Processing or Bypass Mode. Similarly, if a user environment system configuration includes four cores and/or larger RAM, the monitoring application may decide to start with application in Aggressive Processing Mode etc. Additionally, or alternatively, the monitoring application, during the installation of the application may prompt the installer to optionally override default processing mode identified by the application from user environment configuration.

The system and components of the system used for carrying out the processes described herein is illustrated in FIG. 5A and is described in detail along with their functions in the description accompanying FIG. 5A.

FIG. 5A illustrates an exemplary overview of system 500 for controlling application feature processing based on CPU usage and/or necessity to apply an application feature in accordance with one or more embodiments of the present invention. For example, system 500 used for carrying out the processes for controlling application feature processing based on CPU usage and/or necessity to apply an application feature in accordance with one or more embodiments of the present invention may include user equipment to provide input data 512 and/or to receive output data 514, in a user environment 504 such as a laptop computer, a desktop computer, etc. including a monitoring application 516, a processor such as a central processing unit (CPU) and memory, optionally connected to a second user environment via communication network depending on the application in use. The optional second user environment may similarly include a laptop computer, a desktop computer, etc. including a processor such as a CPU and memory, connected to the first user environment via communication network depending on the application in use. The second user environment may or may not include a monitoring application.

Although one user environment is illustrated in FIG. 5A, system 500, a person skilled in the art may readily recognize that any number of user environments are also within the scope and spirit of the invention. The user environments described herein may or may not be in communication with one or more of other user environments depending on the application in use.

The monitoring application 516 may support a number of modes, for example, three modes such as aggressive processing mode 526*a*, moderate processing mode 526*b* and minimal processing or bypass mode 526*c*, and may intelligently choose an appropriate mode based on amount of noise detected and/or availability of processing power to process the audio signal in real time and transmit processed audio to the networking function to pass the data to a destination, which may be cloud or another user environment of a remote individual as shown below in Table 3.

TABLE 3

| Modes | Description | CPU Usage Capacity Range |
|---|---|---|
| Aggressive Processing Mode | Application feature will be applied aggressively | Upper Bound: 70% Lower Bound: N/A |
| Moderate Processing Mode | Application feature will be applied but not as effective as aggressive | Upper Bound: 80% Lower Bound: 70% |
| Minimal Processing or Bypass Mode | Application feature will not be applied | Upper Bound: 85% Lower Bound: 80% |

The CPU usage capacity range described in Table 3 based on system metrics may be defined by the monitoring application based on the CPU capacity requirements of commercially available library(ies) and/or the particular application feature requirement for the data traffic. The upper bound and lower bound values used in Table 3 are for example only, and a person skilled in the art may readily understand that the Upper bound and lower bound may be defined as per application requirement providing the particular application feature. Similarly, although three processing modes are illustrated here, they are used as examples only, and a person skilled in the art may readily understand that use of any number of processing modes is within the scope and spirit of this invention.

The monitoring application 516 may run for example, in user environment 1 504 and may work in tandem with a real-time application feature processor 520 and may include system metrics monitor 522 that monitors user environment system metrics 518, for example, CPU usage and memory available for feature processing. The monitoring application 516 is provided with rules for processing features based on availability of system metrices for feature processing. The real-time application feature processor 520 may further include actual application performing data processing feature 520*b*. The application performing data processing feature may include an application built using commercially available libraries, a commercially available application, an application built by the creator of monitoring application, etc. In an embodiment, the real-time application feature processor 520 may further include a data analyzer 520*a*. As described above in the description accompanying FIGS. 1A, 2A, 3A and 4A, monitoring application 516 may run a job internally which monitors the CPU regularly, and based on current usage, monitoring application 516 may choose the right feature application mode to process the feature. CPU usage may fluctuate in the system under test. Rapid switching between modes may often result in bad user experience. As a result, additional algorithms may be incorporated. For example, the monitoring application may follow the algorithm below to decide when to change the mode:

Switch Mode if (X–Y) %>B % continuously for 20 seconds.

When moderate processing mode or minimal processing mode such as bypass mode is chosen, CPU monitor will go to sleep mode for 300 seconds. (Bypass mode requires no processing or minimal processing and hence no application of the application feature).

Once monitor wakes up, Switch mode if (X–Y) %<A % continuously for 20 seconds.

Where, overall CPU usage=X %; Monitoring Application CPU Usage=Y %; Lower bound of Mode=A %; and Upper bound of Mode=B %. The time values in seconds described herein are for example only, and a person skilled in the art may readily understand that other time values may be defined as per application requirement providing the particular application feature.

In an embodiment, the algorithm may use hysteresis in the CPU usage capacity boundary value, using a delta offset from the boundary value to switch from one mode to another, that is dependent on the "direction" of the mode change. For example, if operating in Moderate Processing Mode, the actual value used to switch to Aggressive Processing Mode may be selected at 69% (nominally 70% as shown in Table 3 minus a delta of 1%), and the CPU Usage Capacity value used to switch back to Moderate Processing Mode may be set at 72% (nominally 70% as shown in Table 3 plus a delta of 2%). These hysteresis delta values (zero, positive, or negative), which could be different for each Mode boundary, are for example only, and a person skilled in the art may readily understand that the values and the deltas may be defined as per application requirement providing the particular application feature.

Although the invention is described as using three modes of behavior, a person skilled in the art may readily understand that this invention may provide a number of modes also referred to herein as number of processing levels, as designed by the developer to dynamically modify the behavior of the application feature based on availability of system metrics, for example, CPU for usage.

Additionally, in an embodiment, the monitoring application further monitors and analyzes incoming and outgoing data in real time for an application feature requirement; determine if a particular application feature is required based on results of the analysis; determine if the particular application feature is to be applied based on the determination of the requirement of the particular application feature and the availability of system resources; and apply the particular application feature based on results of the determination of the requirement of the particular application feature in addition to the availability of system resources.

Alternatively, in an embodiment, the system for controlling application feature processing based on feature requirement to apply the application feature includes one or more user equipment 504, a monitoring application 516, at least one processor and memory 518, wherein the monitoring application 516 monitors and analyzes incoming and outgoing data, for example, 512 and 524 respectively, in real time; determines if a particular application feature is required based on results of the analysis; and applies the particular application feature based on results of the determination of the requirement of the particular application feature.

The system 500 described herein uses similar process in reverse when the data 524 is received from a remote individual (using for example, user environment 2).

Although the invention is described as using three modes of behavior, a person skilled in the art may readily understand that this invention may provide a number of modes as designed by the developer to dynamically modify the behavior of the feature based on availability of CPU for usage and necessity to apply an application feature.

Additionally, in an embodiment, the monitoring application may read the user environment system configurations 528 including but not limited to number of available cores & RAM, which may be done at the time of installation of the monitoring application, or at a later time to begin with an appropriate processing mode. For example, if a user environment system configuration 528 includes one core and/or smaller RAM, the monitoring application may decide to start with application in Minimal Processing or Bypass Mode. Similarly, if a user environment system configuration 528 includes four cores and/or larger RAM, the monitoring application may decide to start with application in Aggressive Processing Mode, etc. Additionally, or alternatively, the monitoring application, during the installation of the application may prompt the installer to optionally override default processing mode identified by the application from user environment configuration.

Thus, in an embodiment, the system for controlling application feature processing based on central processing unit (CPU) usage to apply the application feature includes one or more user equipment, a monitoring application, at least one processor and memory, wherein the monitoring application monitors system metrics for availability of system resources; determines availability of system resources required to perform the particular application feature; and determines if the particular application feature is to be applied based on the determination of the availability of system resources. If it is determined that the system resources are available to perform the particular application feature, the system applies the particular application feature.

Additionally, in an embodiment, the monitoring application further monitors and analyzes incoming and outgoing data in real time for an application; determines if a particular application feature is required based on results of the analysis; determines if the particular application feature is to be applied based on the determination of the requirement of the particular application feature and the availability of system resources; and applies the particular application feature based on results of the determination of the requirement of the particular application feature in addition to the availability of system resources.

In yet another embodiment, the monitoring application analyzes incoming and outgoing data in real time; determines if a particular application feature is required based on results of the analysis; and applies the particular application feature based on results of the determination of the requirement of the particular application feature.

FIG. 5B illustrates an exemplary overview of system 500' for controlling audio processing based on CPU usage and/or audio quality to resolve audio quality issues in accordance with one or more embodiments of the present invention. For example, system 500' used for carrying out the processes for controlling audio processing based on CPU usage and/or audio quality to resolve audio quality issues in accordance with one or more embodiments of the present invention may include user equipment, for example, a microphone 512' and a speaker, 514' in a first user environment 504' such as a laptop computer, a desktop computer, etc. including a monitoring application 516', a processor such as a CPU and memory, connected to a second user environment 510' via communication network 518'. The second user environment 510' may similarly include user equipment, for example, a microphone 530' and a speaker 532', a laptop computer, a desktop computer, etc. including a processor such as a CPU and memory, connected to the first user environment 504' via communication network 518'. Although two user environments are illustrated in FIG. 5B, system 500', a person skilled in the art may readily recognize that more than two user environments are also within the scope and spirit of the invention.

The monitoring application 516' may support a number of modes, for example, three modes such as aggressive processing mode 526a', moderate processing mode 526b' and minimal processing or bypass mode 526c', and may intelligently choose an appropriate mode based on amount of noise detected and availability of processing power to process the audio signal in real time and transmit processed audio to the networking function to pass the audio signal to a destination, which may be another user environment of a remote individual as shown below in Table 4.

TABLE 4

| Modes | Description | CPU Usage Capacity Range |
|---|---|---|
| Aggressive Processing Mode | Noise will be removed completely, and outcome will be the clean speech | Upper Bound: 70% Lower Bound: N/A |
| Moderate Processing Mode | Noise will be removed but not as effective as aggressive | Upper Bound: 80% Lower Bound: 70% |
| Minimal Processing or Bypass Mode | Noise will not be removed | Upper Bound: 85% Lower Bound: 80% |

The CPU usage capacity range described in Table 4 based on system metrics may be defined by the monitoring application based on the CPU capacity requirements of commercially available library(ies) and/or the particular application feature requirement for the data traffic. The upper bound and lower bound values used in Table 4 are for example only, and a person skilled in the art may readily understand that the Upper bound and lower bound may be defined as per application requirement providing the particular application feature. Similarly, although three processing modes are illustrated here, they are used as examples only, and a person skilled in the art may readily understand that use of any number of processing modes is within the scope and spirit of this invention.

The monitoring application 516' may run for example, in user environment 1 504' and may work in tandem with a real-time audio processor 520' and may include system metrics monitor 522' that monitors user environment system metrics 524', for example, CPU usage and memory available for audio processing. The real-time audio processor 520' may further include an actual application performing data processing feature 520b'. The application performing data processing feature 520b' may include an application built using commercially available libraries, a commercially available application such as an audio processor, an application built by the creator of monitoring application, etc. In an embodiment, the real-time application feature processor 520' may further include a data analyzer 520a'. The monitoring application 516' is provided with rules for processing audio based on availability of system metrices for audio processing. As described above in the description accompanying FIGS. 1B, 2B, 3B and 4B monitoring application 516' may run a job internally which monitors the CPU regularly, and based on current usage, monitoring application may choose the right noise elimination mode to process the audio. CPU usage may fluctuate in the system under test. Rapid switching between modes may often result in bad user experience. As a result, additional algorithms may be incorporated. For example, the monitoring application may follow the algorithm below to decide when to change the mode:

Switch Mode if (X−Y) %>B % continuously for 20 seconds.

When moderate processing mode or minimal processing mode such as bypass mode is chosen, CPU monitor will go to sleep mode for 300 seconds. (Bypass mode requires no processing or minimal processing and hence no application of the application feature).

Once monitor wakes up, Switch mode if (X−Y) %<A % continuously for 20 seconds.

Where, overall CPU usage=X %; Monitoring Application CPU Usage=Y %; Lower bound of Mode=A %; and Upper bound of Mode=B %. The time values in seconds described herein are for example only, and a person skilled in the art may readily understand that other time values may be defined as per application requirement providing the particular application feature.

In an embodiment, the algorithm may use hysteresis in the CPU usage capacity boundary value, using a delta offset from the boundary value to switch from one mode to another, that is dependent on the "direction" of the mode change. For example, if operating in Moderate Processing Mode, the actual value used to switch to Aggressive Processing Mode may be selected at 69% (nominally 70% as shown in Table 4 minus a delta of 1%), and the CPU Usage Capacity value used to switch back to Moderate Processing Mode may be set at 72% (nominally 70% as shown in Table 4 plus a delta of 2%). These hysteresis delta values (zero, positive, or negative), which could be different for each Mode boundary, are for example only, and a person skilled in the art may readily understand that the values and the deltas may be defined as per application requirement providing the particular application feature.

Although the invention is described as using three modes of behavior, a person skilled in the art may readily understand that this invention may provide a number of modes also referred to herein as number of processing levels, as designed by the developer to dynamically modify the behavior of the application feature based on availability of system metrics, for example, CPU for usage.

Additionally, in an embodiment, the monitoring application may further monitor and analyze incoming and outgoing audio data in real time to identify human speech and/or noise; determines if there is noise at a level where it should be eliminated in the audio data; determine if the noise suppression feature is to be applied based on the determination of the requirement of the noise reduction feature and the availability of system resources; and apply the noise suppression/reduction feature based on results of the determination in addition to the availability of system resources to perform noise suppression.

In yet another embodiment, the system for controlling noise suppression feature processing based on noise suppression feature requirement to apply the noise suppression feature includes one or more user equipment, a monitoring application, at least one processor and memory, wherein the monitoring application monitors and analyzes incoming and outgoing audio signal in real time to identify human speech and/or noise; determines if there is noise at a level where it should be eliminated in the audio data; and apply the noise suppression/reduction feature based on results of the determination.

The system 500' described herein uses similar process in reverse when the remote individual 508' (using user environment 2 510') is speaking.

Although the invention is described as using three modes of behavior, a person skilled in the art may readily understand that this invention may provide a number of modes as designed by the developer to dynamically modify the behavior of the feature based on availability of CPU for usage and quality of signal.

Additionally, in an embodiment, the monitoring application may read the user environment system configurations 528' including but not limited to number of available cores & RAM, which may be done at the time of installation of the monitoring application, or at a later time, to begin with an appropriate processing mode. For example, if a user environment system configuration 528' includes one core and/or smaller RAM, the monitoring application may decide to start with application in Minimal Processing or Bypass Mode. Similarly, if a user environment system configuration 528' includes four cores and/or larger RAM, the monitoring application may decide to start with application in Aggressive Processing Mode, etc. Additionally, or alternatively, the monitoring application, during the installation of the application may prompt the installer to optionally override default processing mode identified by the application from user environment configuration.

Thus, in an embodiment, the system for controlling audio processing based on central processing unit (CPU) usage to resolve audio quality issues includes one or more user equipment, a monitoring application, at least one processor and memory, wherein the monitoring application monitors system metrics for availability of system resources; determines availability of system resources required to perform noise reduction; and determines if the noise reduction feature is to be applied based on the determination of the availability of system resources. If it is determined that the system resources are available to perform the noise reduction feature, the system applies the noise reduction feature.

Additionally, in an embodiment, the monitoring application may further monitor and analyze incoming and outgoing audio data in real time to identify human speech and/or noise; determines if there is noise at a level where it should be eliminated in the audio data; determine if the noise suppression feature is to be applied based on the determination of the requirement of the noise reduction feature and the availability of system resources; and apply the noise suppression/reduction feature based on results of the determination in addition to the availability of system resources to perform noise suppression.

In an embodiment, the monitoring application monitors and analyzes incoming and outgoing audio data in real time to identify human speech and/or noise; determines if there is noise at a level where it should be eliminated in the audio data. If it is determined that the noise reduction feature is required, applies the noise reduction feature.

FIG. 5C illustrates an exemplary overview of system 500" for controlling video processing based on CPU usage and/or video quality to resolve video quality issues in accordance with one or more embodiments of the present invention. For example, system 500" used for carrying out the processes for controlling video processing based on CPU usage and/or video quality to resolve video quality issues in accordance with one or more embodiments of the present invention may include user equipment, for example, a camera 534", a microphone 512" and a speaker, 514" in a first user environment 504" such as a laptop computer, a desktop computer, etc. including a monitoring application 516", a processor such as a CPU and memory, connected to a second user environment 510" via communication network 518". The second user environment 510" may similarly include user equipment, for example, a camera 536", a microphone 530" and a speaker 532", a laptop computer, a desktop computer, etc. including a processor such as a CPU and memory, connected to the first user environment 504" via communication network 518". Although two user environments are illustrated in FIG. 5C, system 500", a person skilled in the art may readily recognize that more than two user environments are also within the scope and spirit of the invention.

The monitoring application 516" may support a number of modes, for example, three modes such as aggressive processing mode 526a", moderate processing mode 526b" and minimal processing or bypass mode 526c", and may intelligently choose an appropriate mode based on amount of noise and/or video quality issues detected and availability of processing power to process the video signal in real time and transmit processed video to the networking function to pass the to a destination, which may be cloud or another user environment of a remote individual as shown below in Table 5.

TABLE 5

| Modes | Description | CPU Usage Capacity Range |
|---|---|---|
| Aggressive Processing Mode | Noise will be removed completely where outcome will be the clean video, or adding and managing virtual background and/or video filters is done aggressively | Upper Bound: 70% Lower Bound: N/A |
| Moderate Processing Mode | Noise will be removed but not as effective as aggressive, or adding and managing virtual background and/or video filters is done moderately | Upper Bound: 80% Lower Bound: 70% |
| Minimal Processing or Bypass Mode | Noise will not be removed, or virtual background will not be added and/or video filters will not be used | Upper Bound: 85% Lower Bound: 80% |

The CPU usage capacity range described in Table 5 based on system metrics may be defined by the monitoring application based on the CPU capacity requirements of commercially available library(ies) and/or the particular application feature requirement for the data traffic. The upper bound and lower bound values used in Table 5 are for example only, and a person skilled in the art may readily understand that the Upper bound and lower bound may be defined as per application requirement providing the particular application feature. Similarly, although three processing modes are illustrated here, they are used as examples only, and a person skilled in the art may readily understand that use of any number of processing modes is within the scope and spirit of this invention.

The monitoring application 516" may run for example, in user environment 1 504" and may work in tandem with a real-time video processor 520" and may include system metrics monitor 522" that monitors user environment system metrics 524", for example, CPU usage and memory available for video processing. The real-time video processor 520 may further include actual application performing video processing feature 520b. The application performing video processing feature may include an application built using commercially available libraries, a commercially available application, an application built by the creator of monitoring application, etc. In an embodiment, the real-time video processor 520" may further include a data analyzer 520a". The monitoring application 516" is provided with rules for processing video based on availability of system metrices for video processing. As described above in the description accompanying FIG. 3B monitoring application 516" may run a job internally which monitors the CPU regularly, and based on current usage, monitoring application may choose the right noise elimination mode and/or adding and managing virtual background and/or video filters to process the video. CPU usage may fluctuate in the system under test. Rapid switching between modes may often result in bad user experience. As a result, additional algorithms may be incorporated. For example, the monitoring application may follow the algorithm below to decide when to change the mode:

Switch Mode if (X–Y) %>B % continuously for 20 seconds.

When moderate processing mode or minimal processing mode such as bypass mode is chosen, CPU monitor will go to sleep mode for 300 seconds. (Bypass mode requires no processing or minimal processing and hence no application of the application feature).

Once monitor wakes up, Switch mode if (X–Y) %<A % continuously for 20 seconds.

Where, overall CPU usage=X %; Monitoring Application CPU Usage=Y %; Lower bound of Mode=A %; and Upper bound of Mode=B %. The time values in seconds described herein are for example only, and a person skilled in the art may readily understand that other time values may be defined as per application requirement providing the particular application feature.

In an embodiment, the algorithm may use hysteresis in the CPU usage capacity boundary value, using a delta offset from the boundary value to switch from one mode to another, that is dependent on the "direction" of the mode change. For example, if operating in Moderate Processing Mode, the actual value used to switch to Aggressive Processing Mode may be selected at 69% (nominally 70% as shown in Table 5 minus a delta of 1%), and the CPU Usage Capacity value used to switch back to Moderate Processing Mode may be set at 72% (nominally 70% as shown in Table 5 plus a delta of 2%). These hysteresis delta values (zero, positive, or negative), which could be different for each Mode boundary, are for example only, and a person skilled in the art may readily understand that the values and the deltas may be defined as per application requirement providing the particular application feature.

Although the invention is described as using three modes of behavior, a person skilled in the art may readily understand that this invention may provide a number of modes also referred to herein as number of processing levels, as designed by the developer to dynamically modify the behavior of the application feature based on availability of system metrics, for example, CPU for usage.

In an embodiment, the monitoring application may further monitor and analyze incoming and outgoing video data in real time to identify noise; determines if there is noise at a level where it should be eliminated in the video data or adding and managing virtual background and/or video filters is required; determine if the noise suppression feature and/or adding and managing virtual background and/or video filters is to be applied based on the determination of the requirement of the noise reduction feature and/or adding and managing virtual background and/or video filters and the availability of system resources; and apply the noise suppression/reduction feature and/or adding and managing virtual background and/or video filters based on results of the determination in addition to the availability of system resources to perform noise suppression and/or adding and managing virtual background and/or video filters.

In yet another embodiment, the system for controlling video processing feature based on video processing feature requirement to apply the video processing feature includes one or more user equipment, a monitoring application, at least one processor and memory, wherein the monitoring application monitors and analyzes incoming and outgoing video signal in real time to identify noise; determines if there is noise at a level where it should be eliminated in the video data; and apply the video processing feature such as noise suppression, and/or adding and managing virtual background and/or video filters based on results of the determination.

The system 500" described herein uses similar process in reverse when the remote individual 508" (using user environment 2 510") is speaking.

Although the invention is described as using three modes of behavior, a person skilled in the art may readily understand that this invention may provide a number of modes as designed by the developer to dynamically modify the behavior of the feature based on availability of CPU for usage and quality of signal.

Additionally, in an embodiment, the monitoring application may read the user environment system configurations 528" including but not limited to number of available cores & RAM, which may be done at the time of installation of the monitoring application, or at a later time, to begin with an appropriate processing mode. For example, if a user environment system configuration 528" includes one core and/or smaller RAM, the monitoring application may decide to start with application in Minimal Processing or Bypass Mode. Similarly, if a user environment system configuration 528" includes four cores and/or larger RAM, the monitoring application may decide to start with application in Aggressive Processing Mode, etc. Additionally, or alternatively, the monitoring application, during the installation of the application may prompt the installer to optionally override default processing mode identified by the application from user environment configuration.

Thus, in an embodiment, the system for controlling video processing based on central processing unit (CPU) usage to resolve video quality issues includes one or more user equipment, a monitoring application, at least one processor and memory, wherein the monitoring application monitors system metrics for availability of system resources; determines availability of system resources required to perform noise reduction; and determines if the noise reduction feature is to be applied based on the determination of the availability of system resources. If it is determined that the system resources are available to perform the video processing feature, the system applies the video processing feature.

Additionally, in an embodiment, the monitoring application further monitors and analyzes incoming and outgoing video data in real time to identify video quality issues; determines if there is video quality issue at a level where it should be eliminated in the video data; determines if the video processing feature is to be applied based on the determination of the requirement of the video processing feature and the availability of system resources; and applies the video processing feature based on results of the determination in addition to the availability of system resources to perform video processing.

In yet another embodiment, the monitoring application monitors and analyzes incoming and outgoing audio data in real time to identify video quality issues; determines if there is video quality issue at a level where it should be eliminated in the video data. If it is determined that the video processing feature is required, applies the video processing feature.

Figure 6:
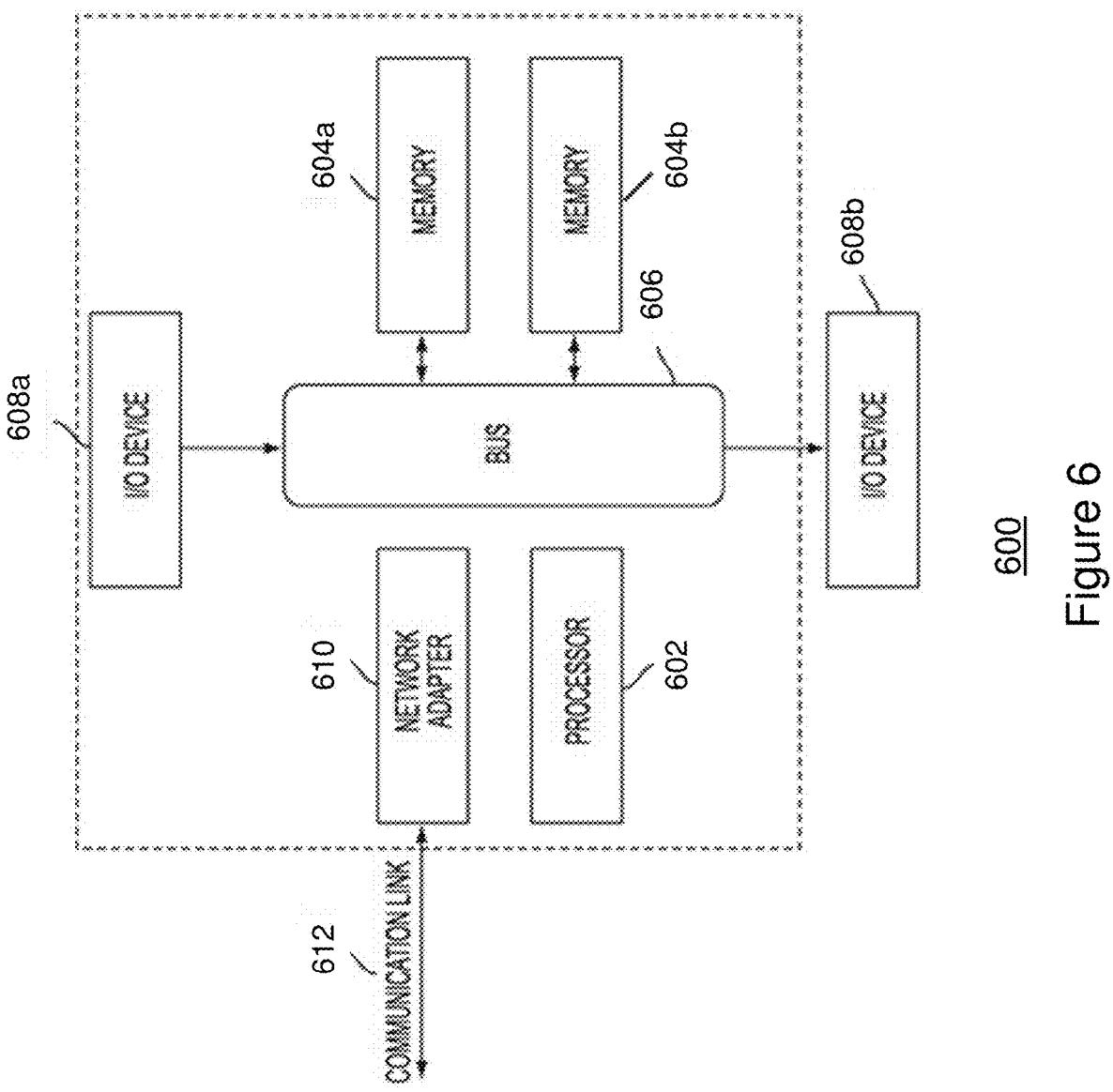
FIG. 6 illustrates a data processing system 600 suitable for storing the computer program product and/or executing program code relating to controlling application feature processing based on central processing unit (CPU) usage and/or feature requirement to apply the application feature in accordance with one or more embodiments of the present invention.

FIG. 6 illustrates a data processing system 600 suitable for storing the computer program product and/or executing program code in accordance with one or more embodiments of the present invention.

The data processing system 600 includes a processor 602 coupled to memory elements 604a-b through a system bus 606. In an embodiment, the data processing system 600 may include more than one processor and each processor may be coupled directly or indirectly to one or more memory elements through a system bus.

Memory elements 604*a-b* can include local memory employed during actual execution of the program code, bulk storage, and cache memories that provide temporary storage of at least some program code in order to reduce the number of times the code must be retrieved from bulk storage during execution. As shown, input/output or I/O devices 608*a-b* (including, but not limited to, keyboards, displays, pointing devices, etc.) are coupled to the data processing system 600. I/O devices 608*a-b* may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method comprising:

monitoring, by a processing system including a processor, system metrics for availability of system resources during a first monitoring period, wherein the system resources include processing power, memory or a combination thereof;

based on the system metrics, determining, by the processing system, that availability of system resources required to perform a first application feature satisfies a first system resource threshold associated with the first application feature during the first monitoring time period resulting in a first determination;

applying, by the processing system, the first application feature based on the first determination;

suspending, by the processing system, the monitoring of the system metrics for the availability of system resources for a sleep mode time period;

upon expiration of the sleep mode time period, monitoring, by the processing system, the availability of system resources for a second monitoring time period;

based on the system metrics, determining, by the processing system, that the availability of system resources required to perform the first application feature does not satisfy a second system resource threshold associated with the first application feature during the second monitoring time period resulting in a second determination, wherein the first system resource threshold is less than the second system resource threshold;

deactivating, by the processing system, the first application feature based on the second determination; and applying, by the processing system, a second application feature based on the second determination.

2. The method of claim 1, further comprising:

monitoring and analyzing incoming and outgoing data in real time resulting in a first analysis;

determining a third application feature is required based on results of the first analysis resulting in a third determination;

determining the third application feature is to be applied based on the third determination; and applying the third application feature.

3. The method of claim 1, wherein the system resources comprise any one or more of: processing power of central processing unit and physical memory.

4. The method of claim 1, wherein applying the first application feature further comprises choosing, by the processing system, an appropriate level of processing mode based on the availability of system resources.

5. The method of claim 4, further comprising analyzing, by the processing system, system configuration resulting in a second analysis, and using, by the processing system, results of the second analysis for choosing the appropriate level of processing mode.

6. The method of claim 1, wherein the first application feature comprises audio processing feature.

7. The method of claim 6, comprising analyzing, by the processing system, audio data in real time to identify human speech and determining, by processing system, that there is noise in the audio data and level of noise in the audio data.

8. The method of claim 1, wherein the first application feature comprises video processing feature.

9. The method of claim 8, comprising analyzing, by the processing system, video data in real time to identify noise in the video data and level of noise in the video data.

10. The method of claim 1, wherein the first application feature comprises data transfer feature.

11. The method of claim 1, wherein the determining that the availability of system resources required to perform a first application satisfies one or more system resource thresholds comprises determining, by the processing system, that the availability of system resources required to perform the first application satisfies a first system threshold, wherein the determining that the availability of system resources required to perform the first application feature does not satisfy the one or more system resource thresholds comprises determining, by the processing system, that the availability of system resources required to perform the first application feature does not satisfy a second system resource threshold, wherein the one or more system resource thresholds comprises the first system resource threshold and the second system resource threshold, wherein the first system resource threshold is less than the second system resource threshold.

12. A system comprising:
a processing system including a processor; and
a memory that stores executable instructions that, when executed by the processing system, facilitate performance of operations, the operations comprising:
monitoring system metrics for availability of system resources during a first monitoring time period, wherein the system resources include processing power, memory or a combination thereof;
based on the system metrics, determining that availability of system resources required to perform a first application feature satisfies a first system resource threshold associated with the first application feature during the first monitoring time period resulting in a first determination;
applying the first application feature based on the first determination;
suspending the monitoring of the system metrics for the availability of system resources during a sleep mode time period;
upon expiration of the sleep mode time period, monitoring the availability of system resources for a second monitoring time period;
based on the system metrics, determining that the availability of system resources required to perform the first application feature does not satisfy a second system resource threshold associated with the first application feature during the second monitoring time period resulting in a second determination, wherein the first system resource threshold is less than the second system resource threshold;
deactivating the first application feature based on the second determination; and
applying a second application feature based on the second determination.

13. The system of claim 12, wherein the operations comprise:
monitoring and analyzing incoming and outgoing data in real time resulting in a first analysis;
determining a third application feature is required based on results of the first analysis resulting in a third determination;
determining the third application feature is to be applied based on the third determination; and
applying the third application feature.

14. The system of claim 12, wherein the system resources comprise any one or more of: processing power of central processing unit and physical memory.

15. The system of claim 12, wherein applying the first application feature further comprises choosing an appropriate level of processing mode based on the availability of system resources.

16. The system of claim 15, wherein the operations comprise analyzing system configuration resulting in a second analysis, and using results of the second analysis for choosing the appropriate level of processing mode.

17. The system of claim 12, wherein the first application feature comprises audio processing feature.

18. The system of claim 17, wherein the operations comprise analyzing audio data in real time to identify human speech and determining that there is noise in the audio data and level of noise in the audio data.

19. The system of claim 12, wherein the first application feature comprises video processing feature.

20. The system of claim 19, wherein the operations comprise analyzing video data in real time to identify noise in the video data and level of noise in the video data.

21. The system of claim 12, wherein the first application feature comprises data transfer feature.

22. The system of claim 21, wherein the operations comprise analyzing data in real time to prioritize the transfer of data based on type of data.

23. A non-transitory machine-readable medium, comprising executable instructions that, when executed by a processing system including a processor, facilitate performance of operations, the operations comprising:
monitoring system metrics for availability of system resources during a first monitoring time period, wherein the system resources include processing power, memory or a combination thereof;
based on the system metrics, determining that availability of system resources required to perform a first application feature satisfies a first system resource threshold associated with the first application feature during the first monitoring time period resulting in a first determination;
applying the first application feature based on the first determination;
suspending the monitoring of the system metrics for the availability of system resources during a sleep mode time period;

upon expiration of the sleep mode time period, monitoring the availability of system resources for a second monitoring time period;

based on the system metrics, determining that the availability of system resources required to perform the first application feature does not satisfy a second system resource threshold associated with the first application feature during the second monitoring time period resulting in a second determination;

deactivating the first application feature based on the second determination; and applying a second application feature based on the second determination.

24. The non-transitory machine-readable medium of claim 23, wherein the operations comprise:

monitoring and analyzing incoming and outgoing data in real time resulting in a first analysis;

determining a third application feature is required based on results of the first analysis resulting in a third determination;

determining the third application feature is to be applied based on the third determination; and applying the third application feature.

25. The non-transitory machine-readable medium of claim 23, wherein the system resources comprise any one or more of: processing power of central processing unit and physical memory.

26. The non-transitory machine-readable medium of claim 23, wherein applying the first application feature further comprises choosing an appropriate level of processing mode based on the availability of system resources.

27. The non-transitory machine-readable medium of claim 26, wherein the operations comprise analyzing system configuration resulting in a second analysis, and using results of the second analysis for choosing the appropriate level of processing mode.

28. The non-transitory machine-readable medium of claim 23, wherein the first application feature comprises audio processing feature.

29. The non-transitory machine-readable medium of claim 28, wherein the operations comprise analyzing audio data in real time to identify human speech and determining that there is noise in the audio data and level of noise in the audio data.

30. The non-transitory machine-readable medium of claim 23, wherein the first application feature comprises video processing feature.

31. The non-transitory machine-readable medium of claim 30, wherein the operations comprise analyzing video data in real time to identify noise in the video data and level of noise in the video data.

32. The non-transitory machine-readable medium of claim 23, wherein the first application feature comprises data transfer feature.

33. The non-transitory machine-readable medium of claim 32, wherein the operations comprise analyzing data in real time to prioritize the transfer of data based on type of data.

* * * * *